(12) United States Patent  
Koyama et al.

(10) Patent No.: US 11,934,243 B2
(45) Date of Patent: Mar. 19, 2024

(54) SEMICONDUCTOR DEVICE

(71) Applicant: Semiconductor Energy Laboratory Co., Ltd., Atsugi (JP)

(72) Inventors: Jun Koyama, Kanagawa (JP); Shunpei Yamazaki, Tokyo (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 283 days.

(21) Appl. No.: 17/145,436

(22) Filed: Jan. 11, 2021

(65) Prior Publication Data

US 2021/0132672 A1 May 6, 2021

Related U.S. Application Data

(63) Continuation of application No. 15/794,033, filed on Oct. 26, 2017, now Pat. No. 11,209,880, which is a
(Continued)

(30) Foreign Application Priority Data

Jan. 23, 2012 (JP) .................................. 2012-011120
Jan. 23, 2012 (JP) .................................. 2012-011124
May 3, 2012 (JP) .................................. 2012-105538

(51) Int. Cl.
G06F 1/00 (2006.01)
G06F 1/26 (2006.01)
G06F 1/3287 (2019.01)

(52) U.S. Cl.
CPC .............. *G06F 1/26* (2013.01); *G06F 1/3287* (2013.01); *Y02D 10/00* (2018.01)

(58) Field of Classification Search
CPC . G06F 1/26; G06F 1/3287; G06F 1/32; Y02D 10/00; G09G 5/003; H01L 21/822;
(Continued)

(56) References Cited

U.S. PATENT DOCUMENTS 5,583,457 A 12/1996 Horiguchi et al.
5,614,847 A 3/1997 Kawahara et al.
(Continued)

FOREIGN PATENT DOCUMENTS

CN 001414563 A 4/2003
CN 101276811 A 10/2008
(Continued)

OTHER PUBLICATIONS

Murakami.M et al., "Theoretical Examination on a Significantly Low Off-State Current of a Transistor Using Crystalline In—Ga—Zn-Oxide", AM-FPD '12 Digest of Technical Papers, Jul. 4, 2012, pp. 171-174.
(Continued)

*Primary Examiner* — Xuxing Chen
(74) *Attorney, Agent, or Firm* — Fish & Richardson P.C.

(57) ABSTRACT

To individually control supply of the power supply voltage to circuits, a semiconductor device includes a CPU, a memory that reads and writes data used in arithmetic operation of the CPU, a signal processing circuit that generates an output signal by converting a data signal generated by the arithmetic operation of the CPU, a first power supply control switch that controls supply of the power supply voltage to the CPU, a second power supply control switch that controls supply of the power supply voltage to the memory, a third power supply control switch that controls supply of the power supply voltage to the signal processing circuit, and a controller that at least has a function of controlling the first to third power supply control switches individually in accordance with an input signal and instruction signals input from the CPU and the signal processing circuit.

6 Claims, 22 Drawing Sheets

Related U.S. Application Data continuation of application No. 13/744,561, filed on Jan. 18, 2013, now Pat. No. 9,804,645.

(58) Field of Classification Search
CPC ... H01L 21/8239; H01L 27/04; H01L 27/105; H01L 27/108; H01L 27/115; H01L 33/26
See application file for complete search history.

(56) References Cited

U.S. PATENT DOCUMENTS

| | | |
|---|---|---|
| 5,731,856 A | 3/1998 | Kim et al. |
| 5,744,864 A | 4/1998 | Cillessen et al. |
| 5,812,021 A | 9/1998 | Ikeda |
| 5,828,235 A | 10/1998 | Horiguchi et al. |
| 5,880,604 A | 3/1999 | Kawahara et al. |
| 6,046,604 A | 4/2000 | Horiguchi et al. |
| 6,107,836 A | 8/2000 | Kawahara et al. |
| 6,175,251 B1 | 1/2001 | Horiguchi et al. |
| 6,281,711 B1 | 8/2001 | Horiguchi et al. |
| 6,294,274 B1 | 9/2001 | Kawazoe et al. |
| 6,356,119 B2 | 3/2002 | Horiguchi et al. |
| 6,403,396 B1 | 6/2002 | Gudesen et al. |
| 6,404,239 B1 | 6/2002 | Kawahara et al. |
| 6,432,739 B1 | 8/2002 | Gudesen et al. |
| 6,504,402 B2 | 1/2003 | Horiguchi et al. |
| 6,535,056 B2 | 3/2003 | Mizuno |
| 6,541,869 B1 | 4/2003 | Gudesen et al. |
| 6,563,174 B2 | 5/2003 | Kawasaki et al. |
| 6,639,455 B2 | 10/2003 | Mizuno |
| 6,657,911 B2 | 12/2003 | Yamaoka et al. |
| 6,696,865 B2 | 2/2004 | Horiguchi et al. |
| 6,727,522 B1 | 4/2004 | Kawasaki et al. |
| 6,765,434 B2 | 7/2004 | Mizuno |
| 6,776,806 B2 | 8/2004 | Gudesen et al. |
| 6,787,825 B1 | 9/2004 | Gudesen et al. |
| 6,894,392 B1 | 5/2005 | Gudesen et al. |
| 6,914,803 B2 | 7/2005 | Yamaoka et al. |
| 6,970,019 B2 | 11/2005 | Horiguchi et al. |
| 6,970,036 B2 | 11/2005 | Mizuno |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,099,183 B2 | 8/2006 | Yamaoka et al. |
| 7,105,868 B2 | 9/2006 | Nause et al. |
| 7,113,421 B2 | 9/2006 | Maeda et al. |
| 7,161,414 B2 | 1/2007 | Mizuno |
| 7,211,825 B2 | 5/2007 | Shih et al. |
| 7,272,068 B2 | 9/2007 | Yamaoka et al. |
| 7,282,782 B2 | 10/2007 | Hoffman et al. |
| 7,297,977 B2 | 11/2007 | Hoffman et al. |
| 7,312,640 B2 | 12/2007 | Horiguchi et al. |
| 7,323,356 B2 | 1/2008 | Hosono et al. |
| 7,352,236 B2 | 4/2008 | Mizuno |
| 7,380,149 B2 | 5/2008 | Ozawa et al. |
| 7,383,456 B2 | 6/2008 | Ono |
| 7,385,224 B2 | 6/2008 | Ishii et al. |
| 7,402,506 B2 | 7/2008 | Levy et al. |
| 7,411,209 B2 | 8/2008 | Endo et al. |
| 7,420,834 B2 | 9/2008 | Maeda et al. |
| 7,436,205 B2 | 10/2008 | Tada |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,474,584 B2 | 1/2009 | Yamaoka et al. |
| 7,477,537 B2 | 1/2009 | Maeda et al. |
| 7,496,775 B2 | 2/2009 | Ono |
| 7,501,293 B2 | 3/2009 | Ito et al. |
| 7,623,364 B2 | 11/2009 | Sasaki et al. |
| 7,646,662 B2 | 1/2010 | Yamaoka et al. |
| 7,667,484 B2 | 2/2010 | Tada |
| 7,674,650 B2 | 3/2010 | Akimoto et al. |
| 7,696,641 B2 | 4/2010 | Tomita |
| 7,696,813 B2 | 4/2010 | Mizuno |
| 7,715,223 B2 | 5/2010 | Maeda et al. |
| 7,732,819 B2 | 6/2010 | Akimoto et al. |
| 7,750,668 B2 | 7/2010 | Horiguchi et al. |
| 7,830,204 B2 | 11/2010 | Mizuno |
| 7,868,479 B2 | 1/2011 | Subramaniam |
| 7,872,891 B2 | 1/2011 | Sasaki et al. |
| 7,961,545 B2 | 6/2011 | Yamaoka et al. |
| 8,046,613 B2 | 10/2011 | Enami et al. |
| 8,072,799 B2 | 12/2011 | Maeda et al. |
| 8,122,233 B2 | 2/2012 | Ozawa et al. |
| 8,140,875 B2 | 3/2012 | Tatsumi |
| 8,212,830 B2 | 7/2012 | Ogiso |
| 8,407,507 B2 | 3/2013 | Suzuki et al. |
| 8,441,843 B2 | 5/2013 | Maeda et al. |
| 8,484,448 B2 | 7/2013 | Ozawa et al. |
| 8,547,753 B2 | 10/2013 | Takemura et al. |
| 8,692,243 B2 | 4/2014 | Kamata et al. |
| 8,760,931 B2 | 6/2014 | Takemura et al. |
| 8,816,469 B2 | 8/2014 | Kamata |
| 8,981,518 B2 | 3/2015 | Kamata |
| 9,123,435 B2 | 9/2015 | Maeda et al. |
| 9,614,097 B2 | 4/2017 | Takemura et al. |
| 9,819,256 B2 | 11/2017 | Kamata |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0076705 A1 | 4/2003 | Yamaoka et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0071032 A1 | 4/2004 | Yamaoka et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2005/0232054 A1 | 10/2005 | Yamaoka et al. |
| 2005/0289367 A1 | 12/2005 | Clark et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0129251 A1 | 6/2006 | Ono |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0268647 A1 | 11/2006 | Yamaoka et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0150780 A1 | 6/2007 | Shimooka |
| 2007/0152217 A1 | 7/2007 | Lai et al. |
| 2007/0157041 A1 | 7/2007 | Youngs |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0019205 A1 | 1/2008 | Yamaoka et al. |
| 2008/0038882 A1 | 2/2008 | Takechi et al. |
| 2008/0038929 A1 | 2/2008 | Chang |
| 2008/0050595 A1 | 2/2008 | Nakagawara et al. |

(56) References Cited

U.S. PATENT DOCUMENTS

| | | |
|---|---|---|
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0239780 A1 | 10/2008 | Sasaki et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0001814 A1 | 1/2009 | Subramaniam |
| 2009/0068773 A1 | 3/2009 | Lai et al. |
| 2009/0073325 A1 | 3/2009 | Kuwabara et al. |
| 2009/0077400 A1 | 3/2009 | Enami et al. |
| 2009/0097302 A1 | 4/2009 | Yamaoka et al. |
| 2009/0106572 A1 | 4/2009 | Taguchi et al. |
| 2009/0114910 A1 | 5/2009 | Chang |
| 2009/0134399 A1 | 5/2009 | Sakakura et al. |
| 2009/0144571 A1 | 6/2009 | Tatsumi |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0034044 A1 | 2/2010 | Sasaki et al. |
| 2010/0065844 A1 | 3/2010 | Tokunaga |
| 2010/0080046 A1 | 4/2010 | Yamaoka et al. |
| 2010/0092800 A1 | 4/2010 | Itagaki et al. |
| 2010/0109002 A1 | 5/2010 | Itagaki et al. |
| 2011/0025409 A1 | 2/2011 | Mizuno |
| 2011/0085400 A1 | 4/2011 | Sasaki et al. |
| 2011/0110145 A1 | 5/2011 | Yamazaki et al. |
| 2011/0140099 A1 | 6/2011 | Yamazaki |
| 2011/0175646 A1 | 7/2011 | Takemura et al. |
| 2011/0176357 A1 | 7/2011 | Koyama et al. |
| 2011/0216579 A1 | 9/2011 | Yamaoka et al. |
| 2011/0245988 A1* | 10/2011 | Ingels .................. G06F 1/26 700/295 |
| 2011/0314314 A1 | 12/2011 | Sengupta |
| 2012/0079300 A1 | 3/2012 | Hachisuga et al. |
| 2012/0119816 A1* | 5/2012 | Rogers ............... G06F 1/3287 327/434 |
| 2013/0122672 A1* | 5/2013 | Or-Bach ............. H03K 17/687 438/455 |
| 2015/0380076 A1 | 12/2015 | Maeda et al. |
| 2017/0170828 A1 | 6/2017 | Takemura et al. |

FOREIGN PATENT DOCUMENTS

| | | |
|---|---|---|
| CN | 100476998 C | 4/2009 |
| CN | 101488366 A | 7/2009 |
| CN | 101802751 A | 8/2010 |
| CN | 101276811 B | 5/2011 |
| CN | 102176454 A | 9/2011 |
| CN | 102324250 A | 1/2012 |
| CN | 102804603 A | 11/2012 |
| EP | 0786776 A | 7/1997 |
| EP | 1624365 A | 2/2006 |
| EP | 1672469 A | 6/2006 |
| EP | 1737044 A | 12/2006 |
| EP | 1959425 A | 8/2008 |
| EP | 2009539 A | 12/2008 |
| EP | 2037348 A | 3/2009 |
| EP | 2226847 A | 9/2010 |
| EP | 2508962 A | 10/2012 |
| JP | 57-081728 A | 5/1982 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 07-086916 A | 3/1995 |
| JP | 08-264794 A | 10/1996 |
| JP | 11-505377 | 5/1999 |
| JP | 2000-044236 A | 2/2000 |
| JP | 2000-082951 A | 3/2000 |
| JP | 2000-098443 A | 4/2000 |
| JP | 2000-150900 A | 5/2000 |
| JP | 2002-076356 A | 3/2002 |
| JP | 2002-512438 | 4/2002 |
| JP | 2002-289859 A | 10/2002 |
| JP | 2003-086000 A | 3/2003 |
| JP | 2003-086808 A | 3/2003 |
| JP | 2003-132683 A | 5/2003 |
| JP | 2003-298410 A | 10/2003 |
| JP | 2004-103957 A | 4/2004 |
| JP | 2004-273614 A | 9/2004 |
| JP | 2004-273732 A | 9/2004 |
| JP | 2005-011166 A | 1/2005 |
| JP | 2006-048190 A | 2/2006 |
| JP | 2006-085786 A | 3/2006 |
| JP | 2006-172059 A | 6/2006 |
| JP | 2007-037192 A | 2/2007 |
| JP | 2007-228420 A | 9/2007 |
| JP | 2007-286807 A | 11/2007 |
| JP | 2008-197394 A | 8/2008 |
| JP | 2008-530631 | 8/2008 |
| JP | 2008-251835 A | 10/2008 |
| JP | 2009-015231 A | 1/2009 |
| JP | 2009-070301 A | 4/2009 |
| JP | 2009-116851 A | 5/2009 |
| JP | 2009-134576 A | 6/2009 |
| JP | 2010-217941 A | 9/2010 |
| JP | 2010-532058 | 9/2010 |
| JP | 2010-282585 A | 12/2010 |
| JP | 2010-287950 A | 12/2010 |
| JP | 2011-043913 A | 3/2011 |
| JP | 2011-120158 A | 6/2011 |
| JP | 2011-171723 A | 9/2011 |
| JP | 2011-172214 A | 9/2011 |
| JP | 2011-176296 A | 9/2011 |
| JP | 2011-243959 A | 12/2011 |
| KR | 2003-0033959 A | 5/2003 |
| KR | 2009-0053887 A | 5/2009 |
| KR | 10-0920288 | 10/2009 |
| KR | 2010-0025014 A | 3/2010 |
| TW | 288117 | 10/1996 |
| TW | I226639 | 1/2005 |
| TW | 200912629 | 3/2009 |
| TW | M394507 | 12/2010 |
| TW | 201203522 | 1/2012 |
| WO | WO-1999/044229 | 9/1999 |
| WO | WO-1999/045582 | 9/1999 |
| WO | WO-1999/063527 | 12/1999 |
| WO | WO-1999/066551 | 12/1999 |
| WO | WO-2000/038234 | 6/2000 |
| WO | WO-2004/114391 | 12/2004 |
| WO | WO-2006/088167 | 8/2006 |
| WO | WO-2009/002966 | 12/2008 |
| WO | WO-2011/089808 | 7/2011 |
| WO | WO-2011/089847 | 7/2011 |
| WO | WO-2011/093150 | 8/2011 |

OTHER PUBLICATIONS

International Search Report (Application No. PCT/JP2013/051230) dated Mar. 5, 2013.

Written Opinion (Application No. PCT/JP2013/051230) dated Mar. 5, 2013.

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

(56) References Cited

OTHER PUBLICATIONS

Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.

Clark.S et al., "First Principles Methods Using CASTEP", Zeitschrift fur Kristallographie, 2005, vol. 220, pp. 567-570.

Coates.D et al., "Optical Studies of the Amorphous Liquid-Cholesteric Liquid Crystal Transition: The "Blue Phase"", Physics Letters, Sep. 10, 1973, vol. 45A, No. 2, pp. 115-116.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Fortunato.E et al., "Wide-Bandgap High-Mobility ZnO Thin-Film Transistors Produced at Room Temperature", Appl. Phys. Lett. (Applied Physics Letters) , Sep. 27, 2004, vol. 85, No. 13, pp. 2541-2543.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.

Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.

Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.

Hirao.T et al., "Novel Top-Gate Zinc Oxide Thin-Film Transistors (ZnO TFTs) for AMLCDs", J. Soc. Inf. Display (Journal of the Society for Information Display), 2007, vol. 15, No. 1, pp. 17-22.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

Ikeda.T et al., "Full-Functional System Liquid Crystal Display Using Cg-Silicon Technology", SID Digest '04 : SID International Symposium Digest of Technical Papers, 2004, vol. 35, pp. 860-863.

Janotti.A et al., "Native Point Defects in ZnO", Phys. Rev. B (Physical Review. B), Oct. 4, 2007, vol. 76, No. 16, pp. 165202-1-165202-22.

Janotti.A et al., "Oxygen Vacancies in ZnO", Appl. Phys. Lett. (Applied Physics Letters) , 2005, vol. 87, pp. 122102-1-122102-3.

Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.

Jin.D et al., "65.2:Distinguished Paper: World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.

Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.

Kikuchi.H et al., "39.1:Invited Paper: Optically Isotropic Nano-Structured Liquid Crystal Composites for Display Applications", SID Digest '09 : SID International Symposium Digest of Technical Papers, May 31, 2009, pp. 578-581.

Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Kikuchi.H et al., "Polymer-Stabilized Liquid Crystal Blue Phases", Nature Materials, Sep. 2, 2002, vol. 1, pp. 64-68.

Kim.S et al., "High-Performance oxide thin film transistors passivated by various gas plasmas", 214th ECS Meeting, 2008, No. 2317, ECS.

Kimizuka.N et al., "Spinel, YbFe2O4, and Yb2Fe3O7 Types of Structures for Compounds in the In2O3 and Sc2O3—A2O3—Bo Systems [A; Fe, Ga, or Al; B: Mg, Mn, Fe, Ni, Cu,or Zn] at Temperatures Over 1000° C.", Journal of Solid State Chemistry, 1985, vol. 60, pp. 382-384.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System", Journal of Solid State Chemistry, Apr. 1, 1995, vol. 116, No. 1, pp. 170-178.

Kitzerow.H et al., "Observation of Blue Phases in Chiral Networks", Liquid Crystals, 1993, vol. 14, No. 3, pp. 911-916.

Kurokawa.Y et al., "UHF RFCPUS on Flexible and Glass Substrates for Secure RFID Systems", Journal of Solid-State Circuits , 2008, vol. 43, No. 1, pp. 292-299.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Lee.H et al., "Current Status of, Challenges to, and Perspective View of AM-OLED", IDW '06 : Proceedings of the 13th International Display Workshops, Dec. 7, 2006, pp. 663-666.

Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.

Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.

Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.

Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Miyasaka.M, "SUFTLA Flexible Microelectronics on Their Way to Business", SID Digest '07 : SID International Symposium Digest of Technical Papers, 2007, vol. 38, pp. 1673-1676.

Mo.Y et al., "Amorphous Oxide TFT Backplanes for Large Size AMOLED Displays", IDW '08 : Proceedings of the 6th International Display Workshops, Dec. 3, 2008, pp. 581-584.

Nakamura.M et al., "The phase relations in the In2O3—Ga2ZnO4—ZnO system at 1350° C.", Journal of Solid State Chemistry, Aug. 1, 1991, vol. 93, No. 2, pp. 298-315.

Nakamura.M, "Synthesis of Homologous Compound with New Long-Period Structure", NIRIM Newsletter, Mar. 1, 1995, vol. 150, pp. 1-4.

(56) References Cited

OTHER PUBLICATIONS

Nomura.K et al., "Amorphous Oxide Semiconductors for High-Performance Flexible Thin-Film Transistors", Jpn. J. Appl. Phys. (Japanese Journal of Applied Physics), 2006, vol. 45, No. 5B, pp. 4303-4308.

Nomura.K et al., "Carrier transport in transparent oxide semiconductor with intrinsic structural randomness probed using single-crystalline InGaO3(ZnO)5 films", Appl. Phys. Lett. (Applied Physics Letters), Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Nowatari.H et al., "60.2: Intermediate Connector With Suppressed Voltage Loss for White Tandem OLEDs", SID Digest '09 : SID International Symposium Digest of Technical Papers, May 31, 2009, vol. 40, pp. 899-902.

Oba.F et al., "Defect energetics in ZnO: A hybrid Hartree-Fock density functional study", Phys. Rev. B (Physical Review. B), 2008, vol. 77, pp. 245202-1-245202-6.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ohara.H et al., "21.3:4.0 In. QVGA AMOLED Display Using In—Ga—Zn-Oxide TFTs With a Novel Passivation Layer", SID Digest '09 : SID International Symposium Digest of Technical Papers, May 31, 2009, pp. 284-287.

Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Orita.M et al., "Amorphous transparent conductive oxide InGaO3(ZnO)m (m<4):a Zn4s conductor", Philosophical Magazine, 2001, vol. 81, No. 5, pp. 501-515.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Osada.T et al., "15.2: Development of Driver-Integrated Panel using Amorphous In—Ga—Zn-Oxide TFT", SID Digest '09 : SID International Symposium Digest of Technical Papers, May 31, 2009, vol. 40 pp. 184-187.

Osada.T et al., "Development of Driver-Integrated Panel Using Amorphous In—Ga—Zn-Oxide TFT", AM-FPD '09 Digest of Technical Papers, Jul. 1, 2009, pp. 33-36.

Park.J et al., "Amorphous Indium-Gallium-Zinc Oxide TFTs and Their Application for Large Size AMOLED", AM-FPD '08 Digest of Technical Papers, Jul. 2, 2008, pp. 275-278.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Park.J et al., "Electronic Transport Properties of Amorphous Indium-Gallium-Zinc Oxide Semiconductor Upon Exposure to Water", Appl. Phys. Lett. (Applied Physics Letters), 2008, vol. 92, pp. 072104-1-072104-3.

Park.J et al., "High performance amorphous oxide thin film transistors with self-aligned top-gate structure", IEDM 09: Technical Digest of International Electron Devices Meeting, Dec. 7, 2009, pp. 191-194.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Park.S et al., "Challenge to Future Displays: Transparent AM-OLED Driven by PEALD Grown ZnO TFT", IMID '07 Digest, 2007, pp. 1249-1252.

Park.S et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Sakata.J et al., "Development of 4.0-In. AMOLED Display With Driver Circuit Using Amorphous In—Ga—Zn-Oxide TFTs", IDW '09 : Proceedings of the 16th International Display Workshops, 2009, pp. 689-692.

Son.K et al., "42.4L: Late-News Paper: 4 Inch QVGA AMOLED Driven by the Threshold Voltage Controlled Amorphous GIZO (Ga2O3—In2O3—ZnO) TFT", SID Digest '08 : SID International Symposium Digest of Technical Papers, May 20, 2008, vol. 39, pp. 633-636.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Tsuda.K et al., "Ultra Low Power Consumption Technologies for Mobile TFT-LCDs", IDW '02 : Proceedings of the 9th International Display Workshops, Dec. 4, 2002, pp. 295-298.

Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Taiwanese Office Action (Application No. 102102361) dated Jul. 18, 2016.

\* cited by examiner

Writing

Reading

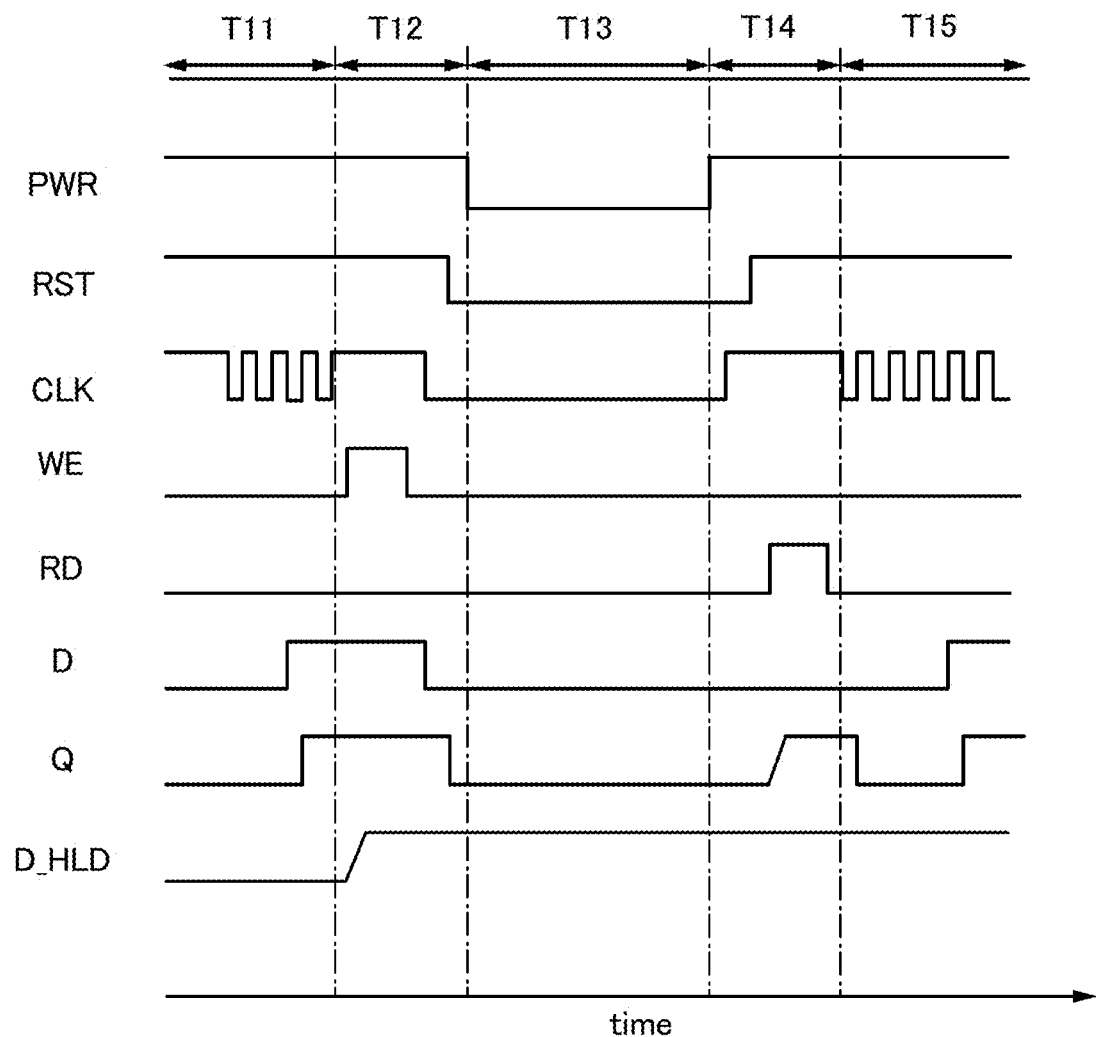

SEMICONDUCTOR DEVICE

CROSS-REFERENCE TO RELATED APPLICATIONS

This application is a continuation of U.S. application Ser. No. 15/794,033, filed Oct. 26, 2017, now allowed, which is a continuation of U.S. application Ser. No. 13/744,561, filed Jan. 18, 2013, now U.S. Pat. No. 9,804,645, which claims the benefit of foreign priority applications filed in Japan as Serial No. 2012-011120 on Jan. 23, 2012, Serial No. 2012-011124 on Jan. 23, 2012, and Serial No. 2012-105538 on May 3, 2012, all of which are incorporated by reference.

TECHNICAL FIELD

The present invention relates to semiconductor devices.

BACKGROUND ART

Development of technologies for reducing power consumption of semiconductor devices such as microcomputers has progressed in recent years.

An example of such a semiconductor device is a microcomputer in which supply of the power supply voltage to a central processing unit (CPU), a memory, and the like can stop in a period during which supply of power is not necessary (e.g., Patent Document 1).

Reference

Patent Document 1: Japanese Published Patent Application No. 2009-116851

DISCLOSURE OF INVENTION

However, power consumption of a conventional microcomputer is not sufficiently reduced. For example, in a conventional microcomputer, supply of the power supply voltage to circuits such as a CPU and a memory is controlled at the same time, so that the power supply voltage is supplied also to a circuit where supply of power is essentially unnecessary; consequently, the microcomputer consumes unnecessary power.

An object of one embodiment of the present invention is to control supply of the power supply voltage to a plurality of circuits independently.

Another object of one embodiment of the present invention is to reduce power consumption.

In one embodiment of the present invention, a controller is provided to control supply of the power supply voltage to a CPU, a memory, and a signal processing circuit individually, whereby a power supply period optimal for each circuit is set to reduce wasted power consumption.

Specifically, switches that control supply of the power supply voltage (also referred to as power supply control switches or power gates) are provided for the respective circuits, and the switches are controlled by the controller. Thus, supply of the power supply voltage to the circuits can be individually controlled.

One embodiment of the present invention is a semiconductor device including a CPU that performs arithmetic operation in accordance with an input signal, a memory that reads and writes data used in the arithmetic operation of the CPU, a signal processing circuit that generates an output signal by converting a data signal generated by the arithmetic operation of the CPU, a first power supply control switch that controls supply of a power supply voltage to the CPU, a second power supply control switch that controls supply of the power supply voltage to the memory, a third power supply control switch that controls supply of the power supply voltage to the signal processing circuit, and a controller that controls the first to third power supply control switches individually in accordance with the input signal, an instruction signal input from the CPU, and an instruction signal input from the signal processing circuit.

In one embodiment of the present invention, a register in the CPU or the signal processing circuit may be formed using a memory circuit including a transistor with low off-state current.

In one embodiment of the present invention, the memory may be formed using a memory device having a memory cell including a transistor with low off-state current.

One embodiment of the present invention is a semiconductor device including a CPU including a register. The register includes a memory circuit. In the memory circuit, one of a source and a drain of a first transistor including an oxide semiconductor is electrically connected to a gate of a second transistor including silicon.

In one embodiment of the present invention, the first transistor and the second transistor are preferably stacked so that an insulating layer is placed therebetween.

In one embodiment of the present invention, supply of the power supply voltage to a CPU, a memory, and a signal processing circuit is individually controlled by a program using a CPU different from the above CPU, whereby a power supply period optimal for each circuit is set to reduce wasted power consumption.

Specifically, switches that control supply of the power supply voltage (power supply control switches) are provided for the respective circuits, and the switches are controlled with a program by using a CPU different from the above CPU. Thus, supply of the power supply voltage to the circuits can be individually controlled.

One embodiment of the present invention is a semiconductor device including a first CPU that performs arithmetic operation in accordance with an input signal, a memory that reads and writes data used in the arithmetic operation of the first CPU, a signal processing circuit that generates an output signal by converting a data signal generated by the arithmetic operation of the first CPU, a first power supply control switch that controls supply of a power supply voltage to the first CPU, a second power supply control switch that controls supply of the power supply voltage to the memory, and a third power supply control switch that controls supply of the power supply voltage to the signal processing circuit. The first to third power supply control switches are individually controlled by a program using a second CPU different from the first CPU.

The third power supply control switch is preferably controlled so that supply of the power supply voltage to the signal processing circuit starts after supply of the power supply voltage to the first CPU starts before data representing a result of the arithmetic operation of the first CPU is input to the signal processing circuit.

The first power supply control switch is preferably controlled so that supply of the power supply voltage to the first CPU stops after data representing a result of the arithmetic operation of the first CPU is input to the signal processing circuit before converted data of the data representing the result of the arithmetic operation is output from the signal processing circuit as an output signal.

The third power supply control switch is preferably controlled so that supply of the power supply voltage to the signal processing circuit starts after supply of the power supply voltage to the first CPU starts before data representing a result of the arithmetic operation of the first CPU is input to the signal processing circuit. In addition, the first power supply control switch is preferably controlled so that supply of the power supply voltage to the first CPU stops after the data representing the result of the arithmetic operation of the first CPU is input to the signal processing circuit before converted data of the data representing the result of the arithmetic operation is output from the signal processing circuit as an output signal.

One embodiment of the present invention is preferably configured as follows. A register in the first CPU includes a memory circuit. The memory circuit includes a first memory circuit that holds data in a period during which the power supply voltage is supplied to the first CPU, and a second memory circuit that holds data in a period during which supply of the power supply voltage to the first CPU stops. The second memory circuit includes a field-effect transistor that controls writing and holding of data. The off-state current of the field-effect transistor included in the second memory circuit is 100 zA or less per channel width of 1 µm.

One embodiment of the present invention is preferably configured as follows. In the memory circuit included in the register of the first CPU, the field-effect transistor in the second memory circuit includes an oxide semiconductor layer in which a channel is formed and in which an oxide semiconductor contained therein has a wider bandgap than silicon. The oxide semiconductor layer includes a phase having atomic arrangement which is triangular or hexagonal when viewed from a direction perpendicular to an a-b plane and in which c-axes of crystal portions are aligned in a direction parallel to a normal vector of a surface where the oxide semiconductor layer is formed or a normal vector of a surface of the oxide semiconductor layer. In the phase, metal atoms are arranged in a layered manner or metal atoms and oxygen atoms are arranged in a layered manner when viewed from a direction perpendicular to a c-axis.

One embodiment of the present invention is preferably configured as follows. The memory includes a memory device. The memory device includes a memory cell. The memory cell includes a field-effect transistor that controls writing and holding of data. The off-state current of the field-effect transistor included in the memory cell is 100 zA or less per channel width of 1 µm.

One embodiment of the present invention is preferably configured as follows. The field-effect transistor in the memory cell includes an oxide semiconductor layer in which a channel is formed and in which an oxide semiconductor contained therein has a wider bandgap than silicon. The oxide semiconductor layer includes a phase having atomic arrangement which is triangular or hexagonal when viewed from a direction perpendicular to an a-b plane and in which c-axes of crystal portions are aligned in a direction parallel to a normal vector of a surface where the oxide semiconductor layer is formed or a normal vector of a surface of the oxide semiconductor layer. In the phase, metal atoms are arranged in a layered manner or metal atoms and oxygen atoms are arranged in a layered manner when viewed from a direction perpendicular to a c-axis.

One embodiment of the present invention is preferably configured as follows. The signal processing circuit includes a register. The register included in the signal processing circuit includes a memory circuit. The memory circuit includes a first memory circuit that holds data in a period during which the power supply voltage is supplied to the signal processing circuit, and a second memory circuit that holds data in a period during which supply of the power supply voltage to the signal processing circuit stops. The second memory circuit includes a field-effect transistor that is configured to control writing and holding of data and has an off-state current of 100 zA or less per channel width of 1 µm.

One embodiment of the present invention is preferably configured as follows. In the register included in the signal processing circuit, the field-effect transistor in the memory circuit includes an oxide semiconductor layer in which a channel is formed and in which an oxide semiconductor contained therein has a wider bandgap than silicon. The oxide semiconductor layer includes a phase having atomic arrangement which is triangular or hexagonal when viewed from a direction perpendicular to an a-b plane and in which c-axes of crystal portions are aligned in a direction parallel to a normal vector of a surface where the oxide semiconductor layer is formed or a normal vector of a surface of the oxide semiconductor layer. In the phase, metal atoms are arranged in a layered manner or metal atoms and oxygen atoms are arranged in a layered manner when viewed from a direction perpendicular to a c-axis.

The second CPU may be included in the semiconductor device.

According to one embodiment of the present invention, a power supply period can be optimized for each individual circuit, so that power consumption can be reduced.

BRIEF DESCRIPTION OF DRAWINGS

In the accompanying drawings:

FIG. 13 is a timing chart for explaining an example of a method for driving a memory circuit.

BEST MODE FOR CARRYING OUT THE INVENTION

Examples of embodiments of the present invention will be described. Note that it will be readily appreciated by those skilled in the art that details of the embodiments can be modified in various ways without departing from the spirit and scope of the present invention. Thus, the present invention should not be limited to the description of the following embodiments.

In this specification, the contents in different embodiments can be combined with each other as appropriate. In addition, the contents of the embodiments can be replaced with each other as appropriate.

The ordinal numbers such as "first" and "second" are used to avoid confusion between components and do not limit the number of the components.

Embodiment 1

In this embodiment, examples of a semiconductor device in which power supply can be controlled independently for each circuit will be described.

First, an example of the configuration of the semiconductor device will be described with reference to FIG. 1.

Figure 1:
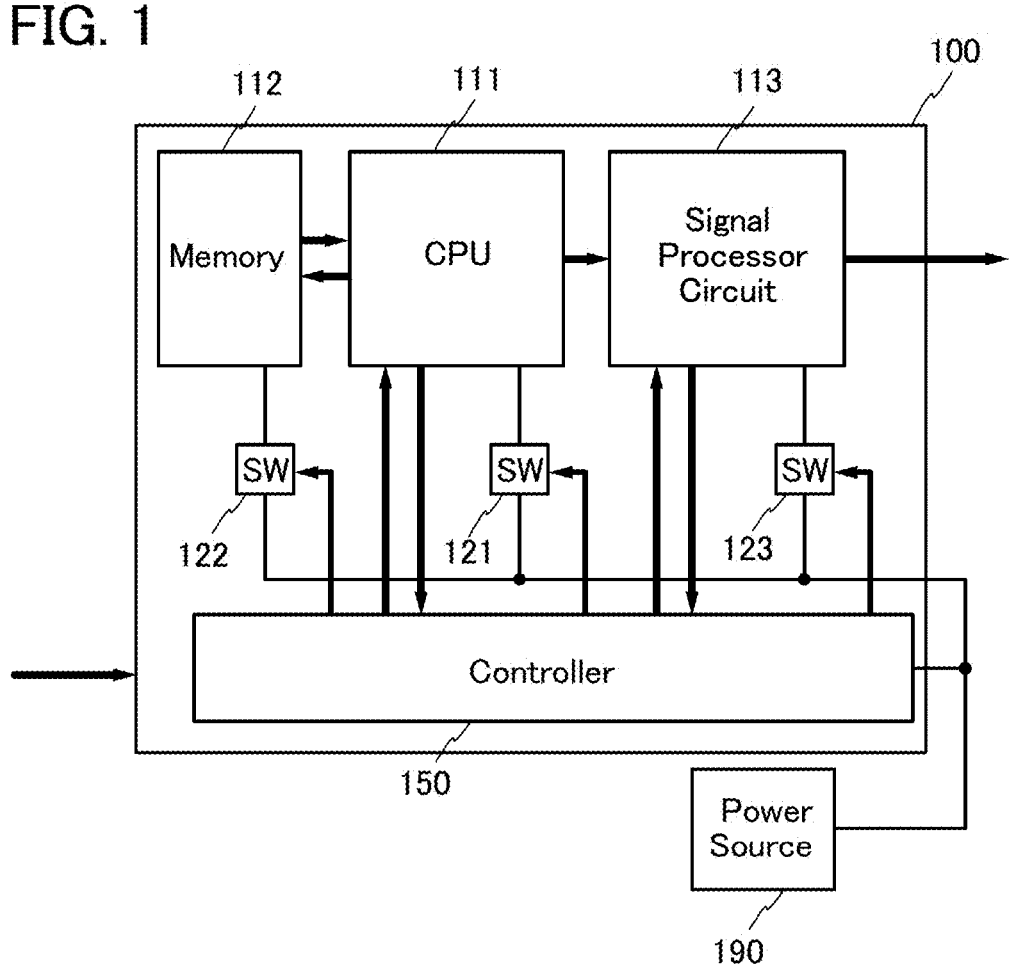
FIG. 1 illustrates an example of a semiconductor device.

A semiconductor device 100 illustrated in FIG. 1 includes a CPU 111, a memory 112, a signal processing circuit 113, power supply control switches (indicated by SW) 121 to 123, and a controller 150. The CPU 111, the memory 112, the signal processing circuit 113, and the controller 150 can input and output signals to/from each other via buses. The semiconductor device 100 is supplied with the power supply voltage through a power supply line from a power source 190. When the power source 190 is a secondary battery, the power source 190 may be provided in the semiconductor device 100.

The CPU 111 has a function of performing arithmetic operation in accordance with an input signal. Examples of the input signal are a clock signal, a signal for controlling the operation of the CPU 111, a signal for controlling the operation of the signal processing circuit 113, and a signal input from an input device. Note that in this specification, plural kinds of signals are simply referred to as a "signal" in some cases unless otherwise specified.

A register in the CPU 111 is composed of a first memory circuit and a second memory circuit, for example. In this case, data is stored in the second memory circuit immediately before power supply to the CPU 111 stops. Then, the data stored in the second memory circuit is input to the first memory circuit immediately after power supply starts again. Thus, the recovery of the CPU 111 at the time when power supply starts again can be fast. Note that one embodiment is not limited to the above structure, and the register may be composed of another memory circuit.

The second memory circuit is formed using a transistor with low off-state current, for example. In this case, the transistor with low off-state current has a function of controlling data writing into the second memory circuit and data retention in the second memory circuit.

In the above case, the off-state current of the transistor with low off-state current is 100 zA or less per channel width of 1 μm.

The transistor with low off-state current can be, for example, a field-effect transistor including a channel formation region that contains an oxide semiconductor with a wider bandgap than silicon and is substantially i-type. The field-effect transistor containing an oxide semiconductor can be fabricated in such a manner, for example, that impurities such as hydrogen or water are reduced as much as possible and oxygen vacancies are reduced as much as possible by supply of oxygen.

The memory circuit formed using the transistor with low off-state current can retain data for a long time simply by turning off the transistor. As a result, the memory circuit can be configured using a simple configuration.

The memory 112 reads and writes data used in arithmetic operation of the CPU 111.

The memory 112 can be, for example, a memory device having a plurality of memory cells each including the transistor with low off-state current. The transistor with low off-state current has a function of controlling writing and holding of data in the memory cell. The memory device can hold data for a long time even when power supply stops. For this reason, forming the memory 112 by using the memory device makes it possible to stop supply of the power supply voltage to the memory 112 in a period during which data rewriting and reading is unnecessary, thereby reducing power consumption. Note that one embodiment is not limited to this structure, and the memory 112 may be composed of another memory device.

The signal processing circuit 113 has a function of generating an output signal by converting a data signal (an operation data signal) that is the arithmetic operation result of the CPU 111. For example, the signal processing circuit 113 has a function of generating a signal for an output device. Examples of the output device are a display, a speaker, and a printer. Alternatively, the signal processing circuit 113 may generate a signal for an input/output device such as a touch panel instead of the output device.

The signal processing circuit 113 is formed using a processor and a register, for example. Further, the signal processing circuit 113 may additionally include a memory that stores data used for arithmetic operation of the signal processing circuit 113. Note that one embodiment is not limited to such structures, and the signal processing circuit 113 may be formed using another integrated circuit.

The register included in the signal processing circuit 113 is composed of, for example, the first memory circuit and the second memory circuit, which can be used in the register of the CPU 111. This results in the fast recovery of the signal processing circuit 113 after stop and restart of power supply. Note that one embodiment is not limited to the above structure, and the register may be composed of another memory circuit.

Figure 2:
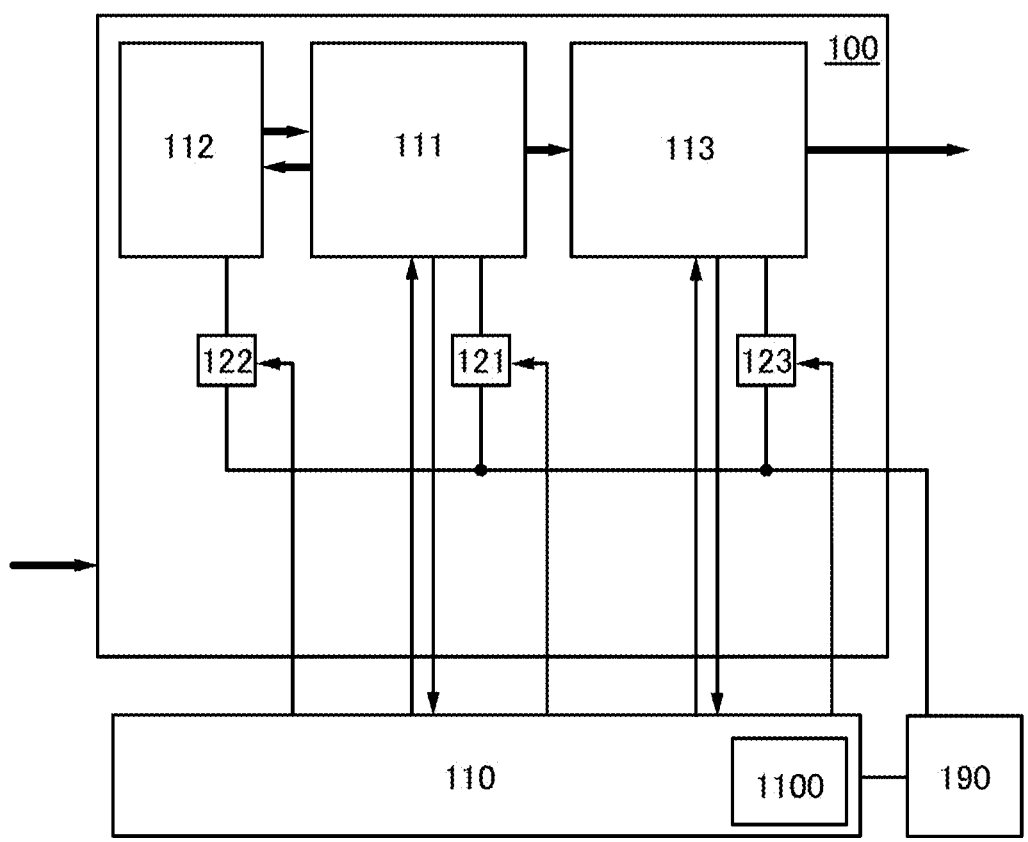
FIG. 2 illustrates an example of a semiconductor device.

FIG. 2 illustrates the semiconductor device 100, a CPU 110 that is a first CPU, and the power source 190. The semiconductor device 100 illustrated in FIG. 2 includes the CPU 111 that is a second CPU, the memory 112, the signal processing circuit 113, and the power supply control switches 121 to 123. The CPU 111, the memory 112, and the signal processing circuit 113 can input and output signals to/from each other via buses. The semiconductor device 100 is supplied with the power supply voltage through a power supply line from the power source 190. When the power source 190 is a secondary battery, the power source 190 may be provided in the semiconductor device 100.

The power supply control switches 121 to 123 are controlled by the CPU 110. Each of the power supply control switches 121 to 123 is controlled by a program by using a signal transmitted from the CPU 110 via a wire or wirelessly.

Note that the CPU 110 may be included in the semiconductor device 100. In other words, the CPU 110 may be provided on the same chip as the CPU 111, the memory 112, and the signal processing circuit 113.

The CPU 110 includes a program memory 1100. The program memory 1100 stores a program for controlling the power supply control switches 121 to 123.

However, one embodiment is not limited to this example, and the program memory 1100 may be separately provided and connected to the CPU 110 instead of being provided inside the CPU 110.

The program memory 1100 may be a volatile memory or a nonvolatile memory. In the case where the program memory 1100 is a volatile memory, initialization for writing a program to the program memory 1100 is needed at the start of operation of the semiconductor device 100. On the other hand, in the case where the program memory 1100 is a nonvolatile memory, a program can be stored in advance.

Further, the program memory 1100 may be a rewritable memory or a non-rewritable memory, and is preferably a rewritable memory. This is because the use of a rewritable memory as the program memory 1100 allows the program for controlling the power supply control switches 121 to 123 to be changed or updated, for example.

Note that as illustrated in FIG. 2, the CPU 110 and the CPU 111 are preferably configured to be capable of wired or wireless communication. The CPU 110 and the signal processing circuit 113 are also preferably configured to be capable of wired or wireless communication.

The power supply control switch 121 has a function of controlling supply of the power supply voltage to the CPU 111.

The power supply control switch 122 has a function of controlling supply of the power supply voltage to the memory 112.

The power supply control switch 123 has a function of controlling supply of the power supply voltage to the signal processing circuit 113.

Each of the power supply control switches 121 to 123 is formed using a field-effect transistor; the field-effect transistor may be the transistor with low off-state current.

A configuration example of the power supply control switches 121 to 123 will be described with reference to FIG. 3.

Figure 3:
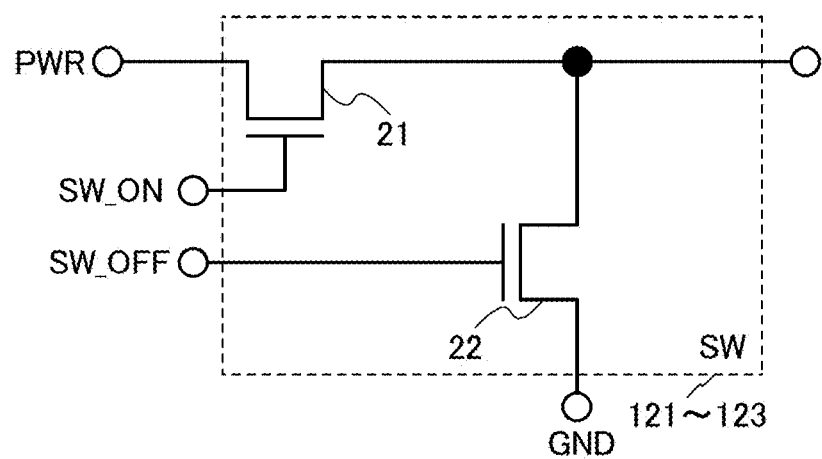
FIG. 3 illustrates an example of the configuration of a power supply control switch.

The power supply control switch illustrated in FIG. 3 includes a transistor 21 and a transistor 22.

The transistor 21 is provided between the power source 190 and the circuit to which supply of power is controlled by the power supply control switch 121, 122, or 123 (the CPU 111, the memory 112, or the signal processing circuit 113). In the configuration illustrated in FIG. 1, a gate of the transistor 21 is supplied with a control signal SW_ON from the controller 150 (or the CPU 110 in the configuration in FIG. 2). The transistor 21 controls whether the power supply voltage is supplied to the circuit such as the CPU 111, the memory 112, or the signal processing circuit 113 or not by being turned on or off.

A gate of the transistor 22 is supplied with a control signal SW_OFF from the controller 150 (or the CPU 110 in the configuration in FIG. 2). The transistor 22 controls whether a ground potential (GND) is supplied to the circuit such as the CPU 111, the memory 112, or the signal processing circuit 113 or not by being turned on or off.

The power supply control switch in FIG. 3 is on when the transistor 21 is on and the transistor 22 is off. The power supply control switch in FIG. 3 is off when the transistor 21 is off and the transistor 22 is on.

The above is the description of the configuration example of the power supply control switch illustrated in FIG. 3.

The controller 150 illustrated in FIG. 1 at least has a function of individually controlling the power supply control switches 121 to 123 in response to the above-described input signal such as the clock signal, an instruction signal input from the CPU 111, and an instruction signal input from the signal processing circuit 113. Moreover, the controller 150 has a function of controlling driving of the CPU 111 and the signal processing circuit 113. The controller 150 is supplied with the power supply voltage.

The CPU 110 illustrated in FIG. 2 controls the power supply control switches 121 to 123 individually by a program. The CPU 110 is supplied with the power supply voltage from the power source 190. Note that one embodiment is not limited to this example, and the CPU 110 may be supplied with the power supply voltage through a power supply line from a power source different from the power source 190.

A configuration example of the controller 150 will be described with reference to FIG. 4.

Figure 4:
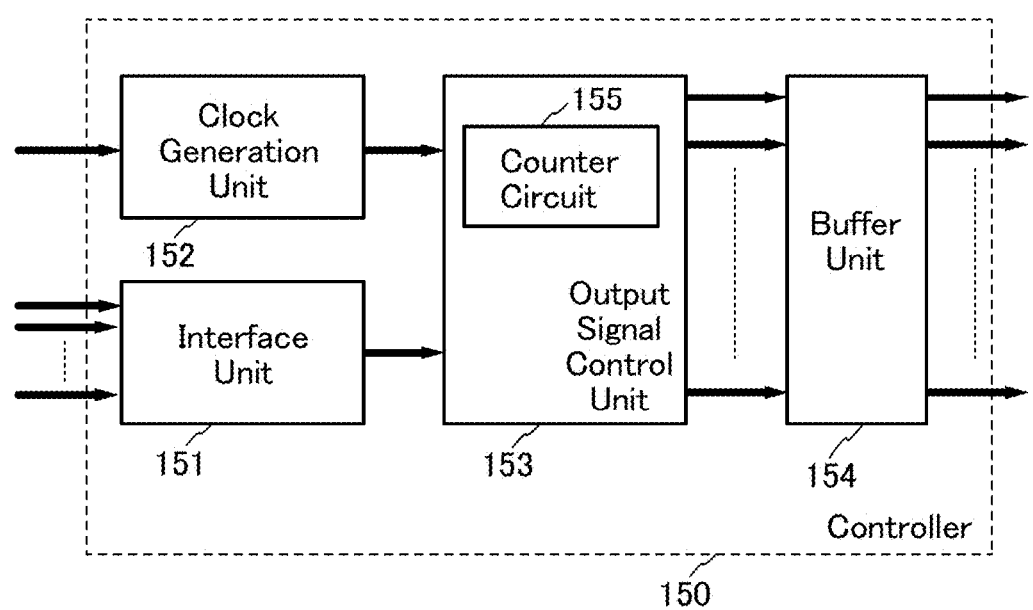
FIG. 4 illustrates an example of the configuration of a controller.

The controller 150 illustrated in FIG. 4 includes an interface unit 151, a clock generation unit 152, an output signal control unit 153, and a buffer unit 154.

Signals such as the above input signal, an instruction signal input from the CPU 111, and an instruction signal input from the signal processing circuit 113 are input to the output signal control unit 153 through the interface unit 151.

The clock generation unit 152 generates a clock signal used in the controller 150 by using an inputted clock signal, and outputs the generated clock signal to the circuits (the output signal control unit 153 included). Dividing the frequency of the inputted clock signal to be used in the controller 150 can reduce power consumption of the controller 150.

The output signal control unit 153 includes a counter circuit 155. The output signal control unit 153 has a function of counting clock signals by the counter circuit 155 and setting the state (high/low) of a plurality of output signals in accordance with a signal input to the controller 150. Examples of the plurality of output signals are control signals for individually controlling the power supply control switches 121 to 123 (e.g., control signals SW_ON and control signals SW_OFF), a signal for controlling the operation of the CPU 111, and a signal for controlling the operation of the signal processing circuit 113.

The signals generated in the output signal control unit 153 are output to the circuits through the buffer unit 154.

The above is the description of the configuration example of the controller illustrated in FIG. 4.

In the semiconductor device 100 illustrated in FIG. 1, the power supply control switches 121 to 123 are provided and individually controlled by the controller 150 in response to an input signal, an instruction signal input from the CPU 111, and an instruction signal input from the signal processing circuit 113.

In the semiconductor device 100 illustrated in FIG. 2, the power supply control switches 121 to 123 are provided and controlled individually by the CPU 110.

The optimal timing of power supply varies between the CPU 111, the memory 112, and the signal processing circuit 113. For this reason, individual optimization of timing of power supply to the CPU 111, the memory 112, and the signal processing circuit 113 can reduce unnecessary power consumption.

Next, specific examples of the semiconductor device in this embodiment will be described with reference to FIGS.

5 to 8. Note that the description of FIG. 1 or FIG. 2 can apply as appropriate to circuits denoted by the same reference numerals as those in FIG. 1 or FIG. 2.

Figure 5:
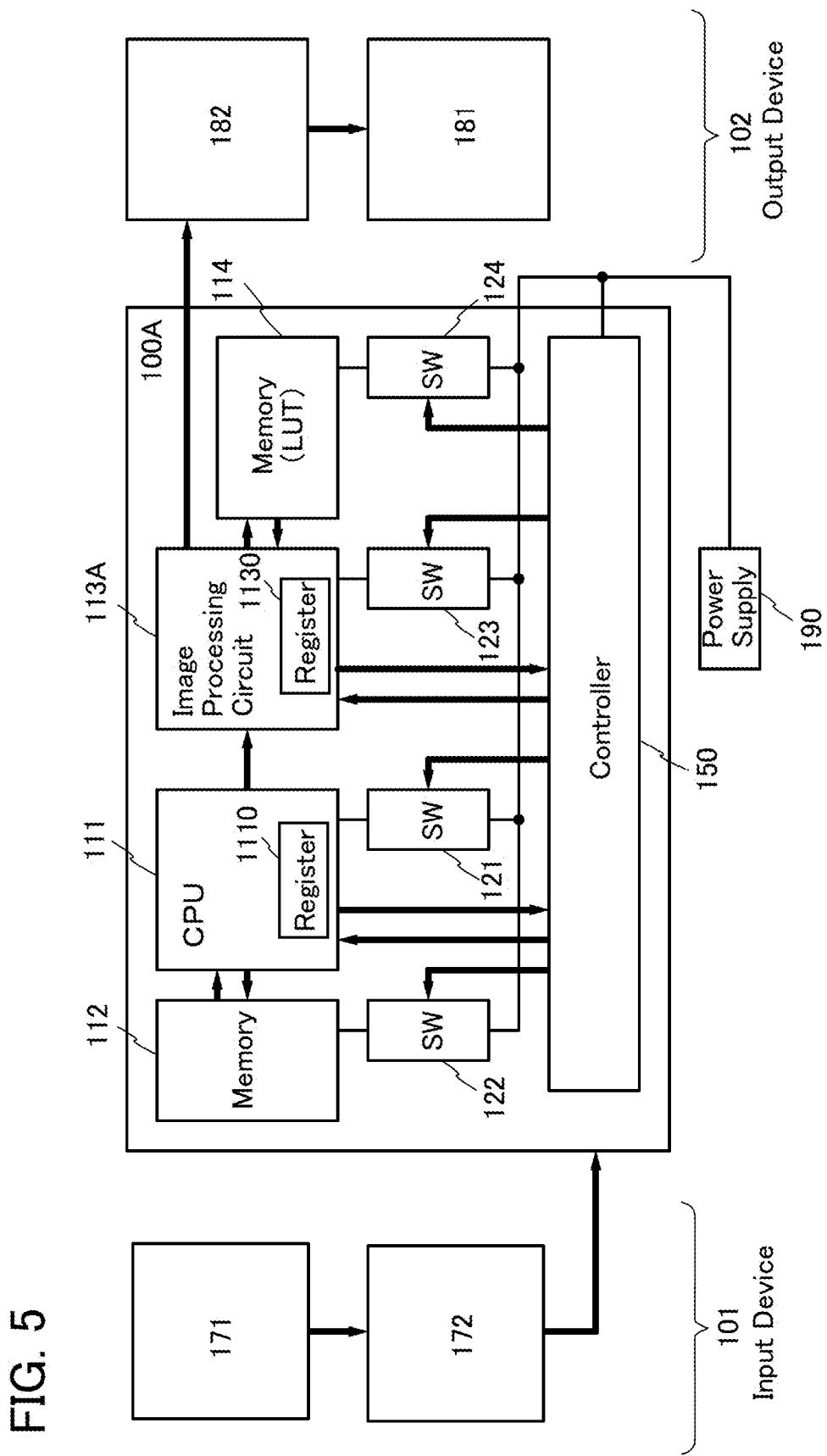
FIG. 5 illustrates an example of a semiconductor device.
Figure 6:
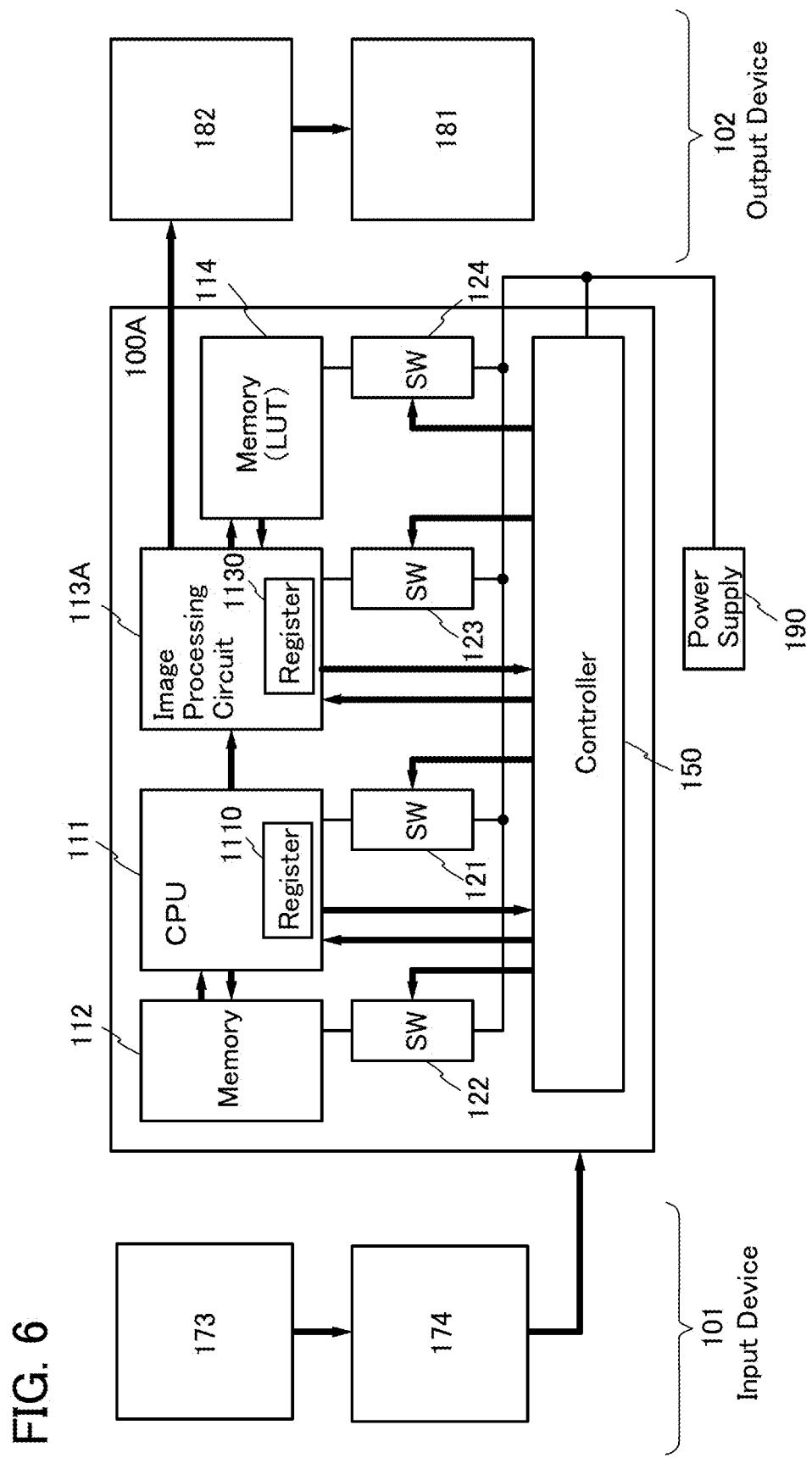
FIG. 6 illustrates an example of a semiconductor device.

A semiconductor device illustrated in FIG. 5 includes a memory 114 and a power supply control switch 124 in addition to an image processing circuit 113A, which is one example of the signal processing circuit 113, and the circuits illustrated in FIG. 1. The CPU 111, the memory 112, the image processing circuit 113A (the signal processing circuit 113), the memory 114, the power supply control switches 121 to 124, and the controller 150 are integrated into one chip serving as a microcomputer 100A. A touch panel 171 and a touch panel controller 172 may be provided as an input device 101. Note that one embodiment is not limited to such a structure, and for example, a keyboard 173 and a keyboard controller 174 may be provided as the input device 101 as illustrated in FIG. 6. In addition, a display 181 and a display controller 182 may be provided as an output device 102. Examples of the display 181 are a liquid crystal display and an electroluminescent (EL) display.

Figure 7:
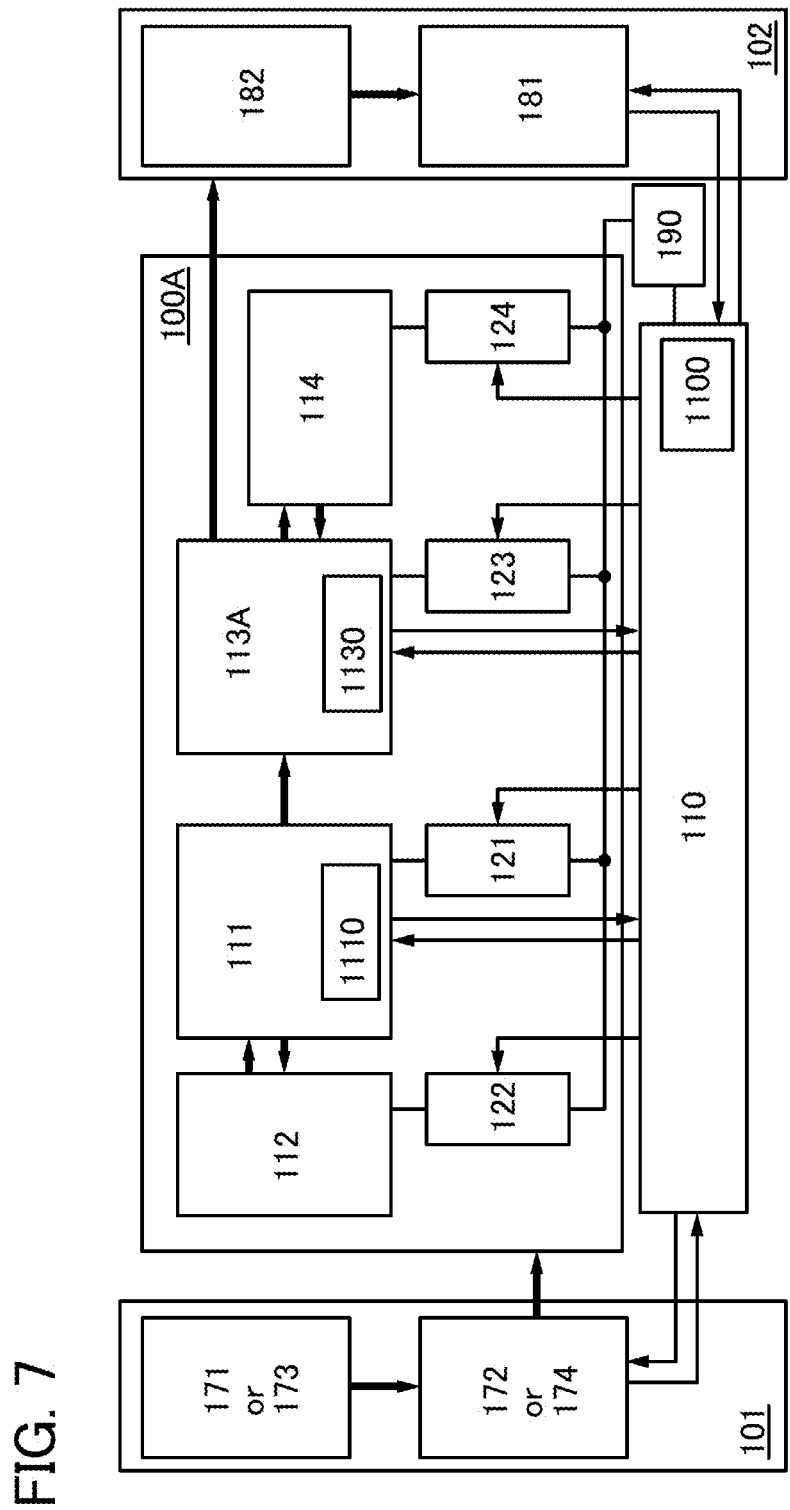
FIG. 7 illustrates an example of a semiconductor device.

A semiconductor device illustrated in FIG. 7 includes the memory 114 and the power supply control switch 124 in addition to the image processing circuit 113A, which is one example of the signal processing circuit 113, and the circuits illustrated in FIG. 2. The microcomputer 100A is composed of one chip including the CPU 111, the memory 112, the image processing circuit 113A (the signal processing circuit 113), the memory 114, and the power supply control switches 121 to 124. The touch panel 171 and the touch panel controller 172 may be provided as the input device 101. Note that one embodiment is not limited to such a structure, and for example, the keyboard 173 and the keyboard controller 174 may be provided as the input device 101. In addition, the display 181 and the display controller 182 may be provided as the output device 102. Examples of the display 181 are a liquid crystal display and an electroluminescent display.

A register 1110 included in the CPU 111 is composed of a plurality of memory circuits each including the first memory circuit and the second memory circuit.

As the memory 112, a memory device having memory cells each including the transistor with low off-state current can be used.

The image processing circuit 113A has a function of generating an image signal output to the output device by converting a data signal generated from arithmetic operation of the CPU 111.

A register 1130 included in the image processing circuit 113A is formed using a memory circuit that can be used in the signal processing circuit 113, for example.

In the memory 114, reading or writing of data is performed by conversion processing of the image processing circuit 113A. Data to be a lookup table (LUT) is stored in the memory 114. The memory 114 is constituted of at least one of ROM and RAM, for example.

The memory 114 is composed of, for example, a memory device having memory cells each including the transistor with low off-state current.

The power supply control switch 124 has a function of controlling supply of the power supply voltage to the memory 114.

The controller 150 controls the power supply control switches 121 to 124 individually in response to an input signal (a signal from the input device 101 included), an instruction signal input from the CPU 111, and an instruction signal input from the signal processing circuit 113.

In FIG. 7, the CPU 110 individually controls the power supply control switches 121 to 124 by using a program.

The power supply control switch 124 is formed using a field-effect transistor. For example, the power supply control switch 124 may have the configuration illustrated in FIG. 3.

In the examples of the semiconductor devices illustrated in FIGS. 5 and 6, the power supply control switches 121 to 124 are provided and individually controlled by the controller 150 in response to an input signal from the input device 101, an instruction signal input from the CPU 111, and an instruction signal input from the signal processing circuit 113. Note that it is possible that the CPU 111 is divided into a plurality of blocks, a power supply control switch different from the power supply control switch 121 is provided, and the plurality of power supply control switches are individually controlled by the controller 150. Moreover, it is possible that the image processing circuit 113A is divided into a plurality of blocks, a power supply control switch different from the power supply control switch 123 is provided, and the plurality of power supply control switches are individually controlled by the controller 150.

In the example of the semiconductor device illustrated in FIG. 7, the power supply control switches 121 to 124 are provided, and the CPU 110 controls the power supply control switches 121 to 124 individually by using a program. Note that it is possible that the CPU 111 is divided into a plurality of blocks, a power supply control switch different from the power supply control switch 121 is provided, and the plurality of power supply control switches are individually controlled using a program by the CPU 110. Further, it is possible that the image processing circuit 113A is divided into a plurality of blocks, a power supply control switch different from the power supply control switch 123 is provided, and the plurality of power supply control switches are individually controlled using a program by the CPU 110.

That is, a plurality of power supply control switches may be provided for one circuit to control supply of power thereto.

Next, as an example of a method for driving the semiconductor device in this embodiment, an example of a power supply method for the semiconductor devices illustrated in FIGS. 5 and 7 will be described with reference to a timing chart in FIG. 8.

Figure 8:
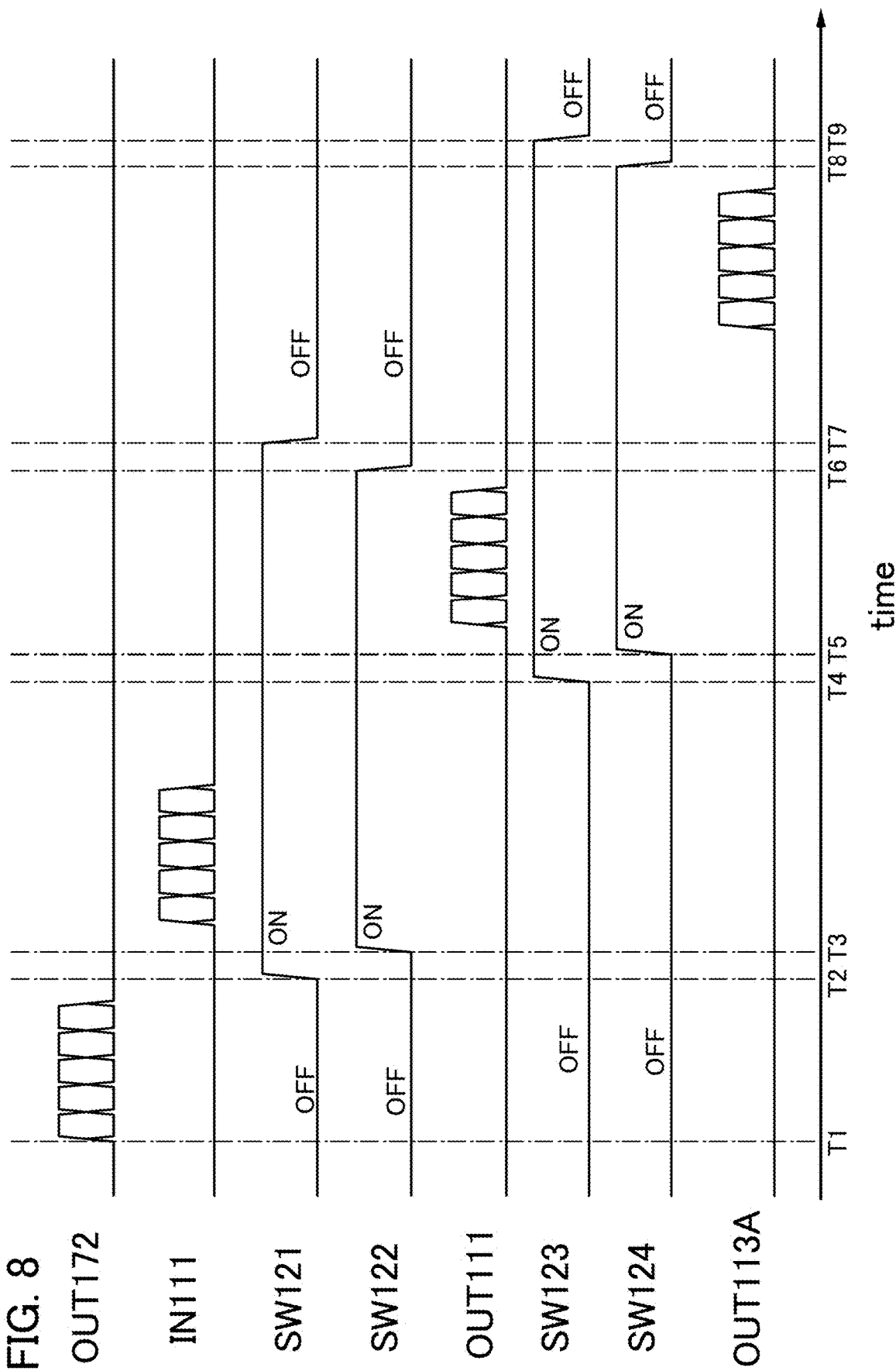
FIG. 8 is a timing chart for explaining an example of a method for driving a semiconductor device.

As illustrated in FIG. 8, when the touch panel 171 is operated at time T1, for example, data (pulses of OUT172) of an output signal (OUT172) of the touch panel controller 172 is input to the controller 150 (or the CPU 110 in the configuration in FIG. 7).

In this case, the controller 150 (or the CPU 110 in the configuration in FIG. 7) turns on the power supply control switch 121 (ON in the chart represents the on state) at time T2 so that supply of the power supply voltage to the CPU 111 starts, and turns on the power supply control switch 122 at time T3 so that supply of the power supply voltage to the memory 112 starts. For example, the levels of control signals (control signals SW_ON and control signals SW_OFF) output from the controller 150 are set so as to turn on the power supply control switches 121 and 122. Although supply of the power supply voltage to the CPU 111 and to the memory 112 may start at the same time, power consumption can be further reduced by controlling the power supply control switches 121 and 122 individually so that supply of the power supply voltage to the memory 112 is not started after supply of the power supply voltage to the CPU 111 starts until the memory 112 needs to be accessed.

After supply of the power supply voltage to the CPU 111 and the memory 112 starts, a delayed output signal (OUT172) of the touch panel controller 172 is input to the CPU 111. Note that the output signal (OUT172) can be delayed by a delay circuit.

At this time, the CPU 111 performs arithmetic operation based on data in the memory 112 and data (pulses of IN111) of an input signal (IN111) including the output signal (OUT172) of the touch panel controller 172. Then, supply of the power supply voltage to the image processing circuit 113A is started at time T4 by turning on the power supply control switch 123, and supply of the power supply voltage to the memory 114 is started at time T5 by turning on the power supply control switch 124. For example, an instruction signal from the CPU 111 sets the levels of control signals (control signals SW_ON and control signals SW_OFF) output from the controller 150 so that the power supply control switches 123 and 124 are turned on. Note that one embodiment is not limited thereto, and the output signal (OUT172) of the touch panel controller 172 may set the levels of control signals output from the controller 150 so that the power supply control switches 123 and 124 are turned on. Although supply of the power supply voltage to the image processing circuit 113A and to the memory 114 may start at the same time, power consumption can be further reduced by controlling the power supply control switches 123 and 124 individually so that supply of the power supply voltage to the memory 114 is not started after supply of the power supply voltage to the image processing circuit 113A starts until the memory 114 needs to be accessed.

Then, the CPU 111 outputs a data signal (OUT111) including data (pulses of OUT111) representing the arithmetic operation result to the image processing circuit 113A. When output of the data signal to the image processing circuit 113A finishes, supply of the power supply voltage to the memory 112 is stopped at time T6 by turning off the power supply control switch 122 (OFF in the chart represents the off state), and supply of the power supply voltage to the CPU 111 is stopped at time T7 by turning off the power supply control switch 121. For example, an instruction signal from the CPU 111 sets the levels of control signals output from the controller 150 so that the power supply control switches 121 and 122 are turned off. Note that one embodiment is not limited thereto, and an instruction signal from the image processing circuit 113A may set the levels of control signals output from the controller 150 so that the power supply control switches 121 and 122 are turned off. Although supply of the power supply voltage to the CPU 111 and to the memory 112 may stop at the same time, power consumption can be further reduced in the following manner: the power supply control switches 121 and 122 are controlled individually so that, while the power supply voltage is being supplied to the CPU 111, supply of the power supply voltage to the memory 112 stops when access to the memory 112 becomes unnecessary. In addition, the recovery of the CPU 111 after restart of supply of the power supply voltage can be fast when data is stored in the second memory circuits included in the plurality of memory circuits in the register 1110 immediately before supply of the power supply voltage to the CPU 111 stops, and then the data stored in the second memory circuits is input to the first memory circuits immediately after supply of the power supply voltage starts again.

The image processing circuit 113A generates a signal output to the display controller 182 by converting the inputted output signal (OUT111) of the CPU 111. After the conversion processing, a signal (OUT113A) including generated data (pulses of OUT113A) is output to the display controller 182, supply of the power supply voltage to the memory 114 is stopped at time T8 by turning off the power supply control switch 124, and supply of the power supply voltage to the image processing circuit 113A is stopped at time T9 by turning off the power supply control switch 123. For example, an instruction signal from the image processing circuit 113A sets the levels of control signals (control signals SW_ON and control signals SW_OFF) output from the controller 150 so that the power supply control switches 123 and 124 are turned off. Although supply of the power supply voltage to the image processing circuit 113A and to the memory 114 may stop at the same time, power consumption can be further reduced in the following manner: the power supply control switches 123 and 124 are controlled individually so that, while the power supply voltage is being supplied to the image processing circuit 113A, supply of the power supply voltage to the memory 114 stops when access to the memory 114 becomes unnecessary. In addition, the recovery of the image processing circuit 113A after restart of supply of the power supply voltage can be fast when data is stored in the second memory circuit in the register 1130 immediately before supply of the power supply voltage to the image processing circuit 113A stops, and then the data stored in the second memory circuit is input to the first memory circuit immediately after supply of the power supply voltage starts again.

The above is the example of a power supply method for the semiconductor devices illustrated in FIGS. 5 and 7.

As has been described with reference to FIGS. 1 to 8, in the semiconductor device according to one example of this embodiment, the power supply control switches (the first to third power supply control switches) are provided for the respective circuits, and the plurality of power supply control switches are individually controlled by the controller or the CPU serving as the first CPU in accordance with an input signal, an instruction signal input from the CPU (the second CPU), and an instruction signal input from the signal processing circuit.

Since the optimal timing of power supply varies between the circuits (the CPU, the memory, and the signal processing circuit), unnecessary power consumption can be reduced by individual optimization of timing of power supply to the circuits.

For example, power consumption can be reduced by controlling the third power supply control switch so that supply of the power supply voltage to the signal processing circuit starts after supply of the power supply voltage to the CPU starts before data representing the arithmetic operation result of the CPU is input to the signal processing circuit.

Further, power consumption can be reduced by controlling the first power supply control switch so that supply of the power supply voltage to the CPU stops after data representing the arithmetic operation result of the CPU is input to the signal processing circuit before converted data of the data representing the arithmetic operation result is output from the signal processing circuit as an output signal.

Embodiment 2

In this embodiment, examples of a memory device that can be used as the memory of the semiconductor device in Embodiment 1 will be described.

An example of a memory device in this embodiment includes a memory cell array including a plurality of memory cells arranged in a matrix of i rows (i is a natural number of 2 or more) and j columns (j is a natural number).

The memory cell corresponds to the memory circuit in the semiconductor device of Embodiment 1.

An example of the memory cell array in the memory device of this embodiment will be described with reference to FIG. 9.

Figure 9:
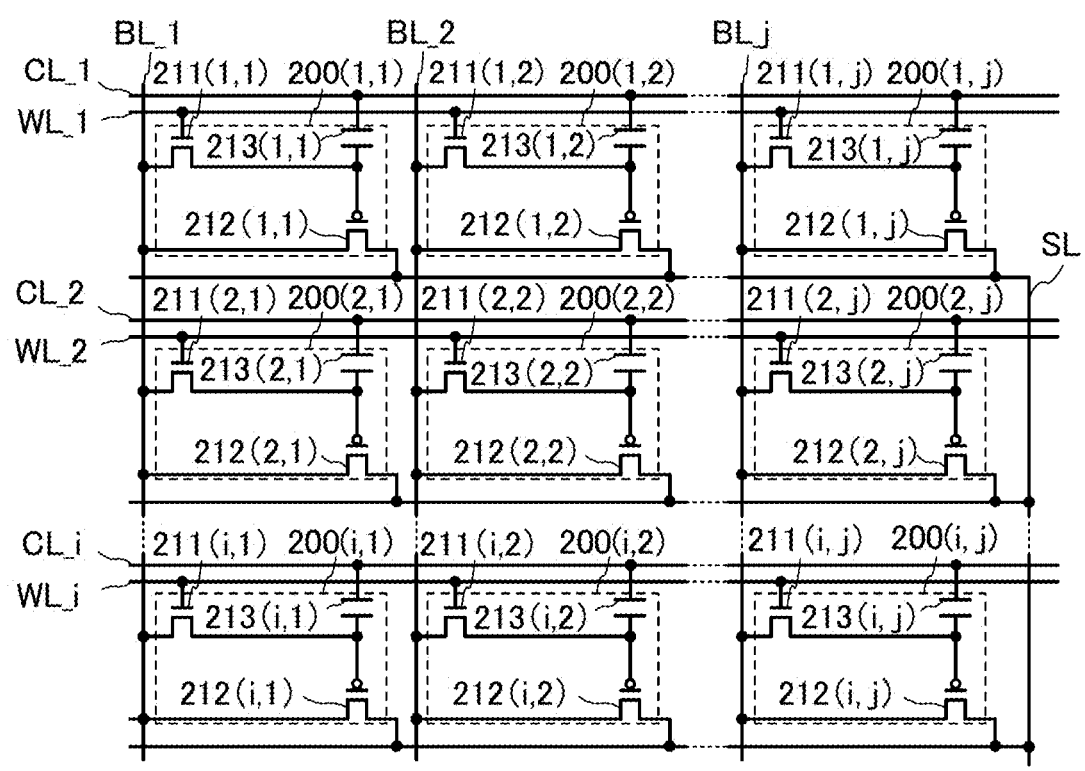
FIG. 9 illustrates an example of the configuration of a memory device.

The memory cell array illustrated in FIG. 9 includes a plurality of memory cells 200 arranged in a matrix of i rows and j columns, first to j-th bit lines BL, first to i-th word lines WL, first to i-th capacitor lines CL, and a source line SL to which a predetermined potential is applied.

In the memory cell array illustrated in FIG. 9, the memory cell 200 of the M-th row (M is a natural number of 1 to i) and the N-th column (N is a natural number of 1 to j), that is, the memory cell 200(M,N) includes a transistor 211(M, N), a transistor 212(M,N), and a capacitor 213(M,N).

One of a source and a drain of the transistor 211(M,N) is electrically connected to the bit line BL_N. A gate of a source and a drain of the transistor 211(M,N) is electrically connected to the word line WL_M.

The transistor 211(M,N) is an n-channel transistor and controls writing and holding of data.

As the transistor 211(M,N), the transistor with low off-state current described in Embodiment 1 can be used.

The transistor 212(M,N) is a p-channel transistor. One of a source and a drain of the transistor 212(M,N) is electrically connected to the bit line BL_N. The other of the source and the drain of the transistor 212(M,N) is electrically connected to the source line SL. A gate of the transistor 212(M,N) is electrically connected to the other of the source and the drain of the transistor 211(M,N).

The transistor 212(M,N) functions as an output transistor that sets the potential of data to be output.

One of a pair of electrodes of the capacitor 213(M,N) is electrically connected to the other of the source and the drain of the transistor 211(M,N), and the other thereof is electrically connected to the capacitor line CL_M.

The capacitor 213(M,N) functions as a storage capacitor that holds data.

The above is the description of the configuration example of the memory cell array illustrated in FIG. 9.

Figure 10:
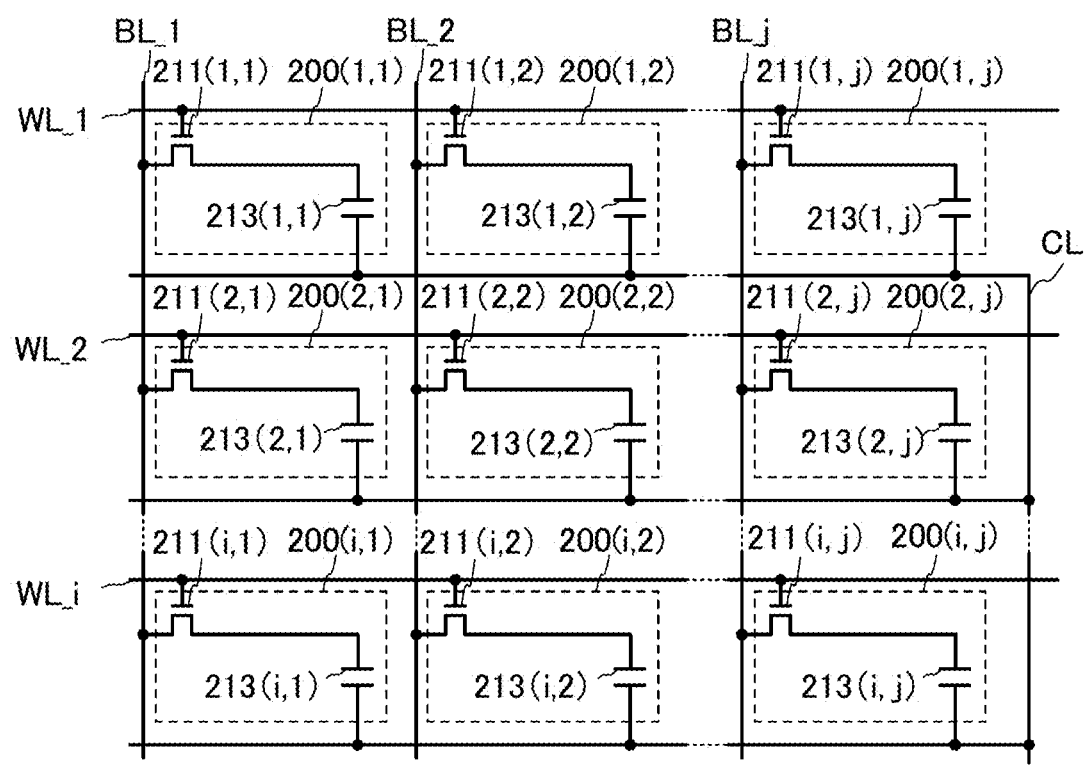
FIG. 10 illustrates an example of the configuration of a memory device.

Note that the transistor 212 is not necessarily provided in the memory cell. For example, the memory cell may have a configuration illustrated in FIG. 10, in which case the capacitor lines CL can be integrated into one line to serve as a substitute for the source line SL.

Figure 11A:
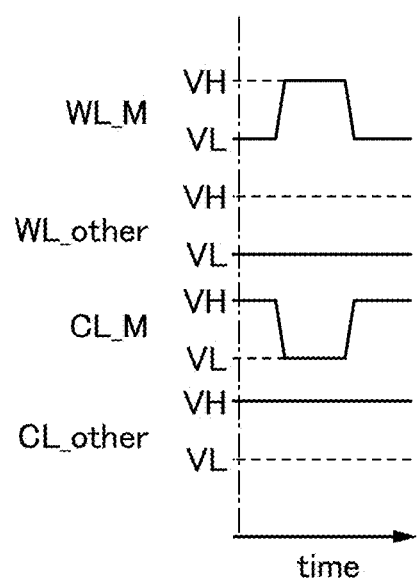
FIGS. 11A and 11B are timing charts for explaining an example of a method for driving a memory device.
Figure 11B:
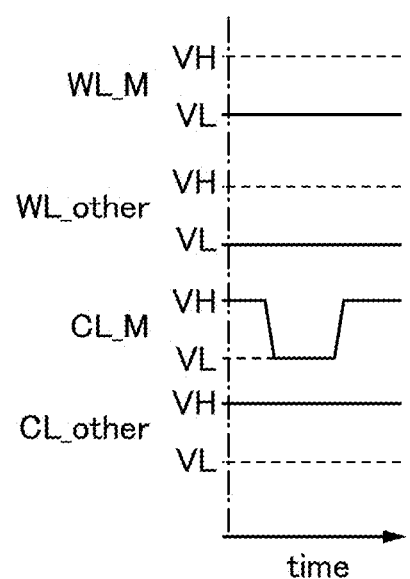

Next, an example of a method for driving a memory device including the memory cell array illustrated in FIG. 9 will be described with reference to FIGS. 11A and 11B. FIGS. 11A and 11B are timing charts for explaining the example of a method for driving a memory device. Here, the case where data is sequentially written into the memory cells 200 of the M-th row and then the written data is read is described as an example; however, one embodiment is not limited to this case. For example, write operations may be performed repeatedly without performing a read operation.

First, in order to write data into the memory cells 200 of the M-th row (for "Writing"), the potential of the M-th word line WL_M is set at VH and the potentials of the other word lines WL_other are set at VL as illustrated in FIG. 11A.

Note that VH is a potential higher than a reference potential (e.g., the ground potential) and, for example, is a high power supply potential. Moreover, VL is a potential lower than or equal to the reference potential and, for example, is a low power supply potential.

At this time, in each of the memory cells 200 of the M-th row, the transistor 211 is turned on and the potential of one of the pair of electrodes of the capacitor 213 becomes equal to the potential of the corresponding bit line BL.

Then, the transistor 211 is turned off and the gate of the transistor 212 becomes floating, so that the potential of the gate of the transistor 212 is held.

Data can be written into all the memory cells 200 by performing the above operation row by row.

In order to read data from the memory cells 200 of the M-th row (for "Reading"), the potentials of all the word lines WL are set at VL, the potential of the M-th capacitor line CL_M is set at VL, and the potentials of the other capacitor lines CL_other are set at VH as illustrated in FIG. 11B.

In each of the memory cells 200 of the M-th row, the resistance between the source and the drain of the transistor 212 depends on the gate voltage of the transistor 212. In addition, a potential corresponding to the amount of current flowing between the source and the drain of the transistor 212 can be read from the memory cell 200 as data.

Data can be read from all the memory cells 200 by repeatedly performing the above operation row by row. The above is the description of the example of a method for driving the semiconductor device illustrated in FIG. 9.

As has been described with reference to FIG. 9, FIG. 10, and FIGS. 11A and 11B, in the semiconductor device according to one example of this embodiment, the data retention time can be extended by using a field-effect transistor with low off-state current as a transistor that controls writing and holding of data. Consequently, data can be retained even when supply of the power supply voltage stops.

Embodiment 3

In this embodiment, an example of a memory circuit included in the register in the semiconductor device of Embodiment 1 will be described.

A configuration example of a memory circuit in this embodiment will be described with reference to FIGS. 12A and 12B.

Figure 12A:
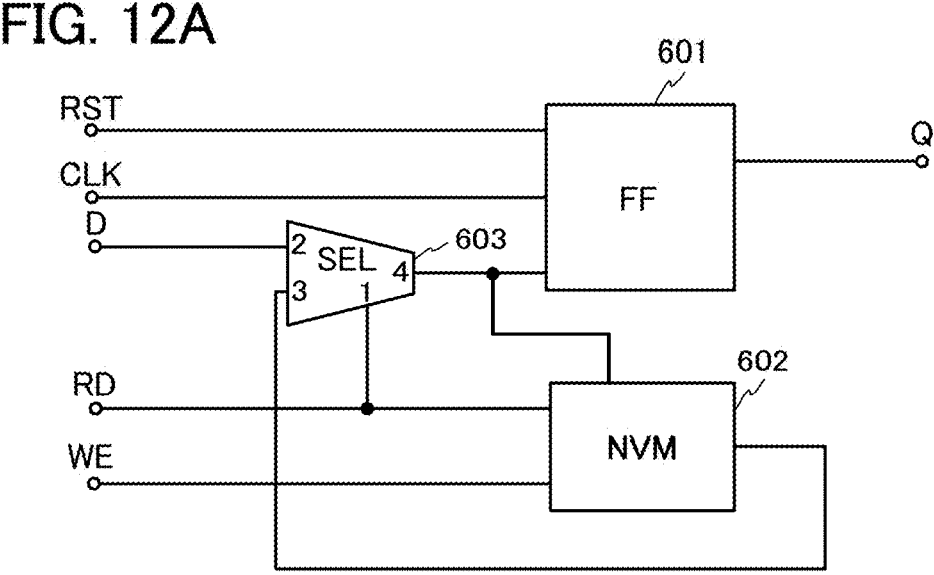
FIGS. 12A and 12B illustrate an example of the configuration of a memory circuit.

As illustrated in FIG. 12A, the memory circuit in this embodiment includes a flip-flop (indicated by FF) 601, a memory circuit (NVM) 602, and a selector (SEL) 603.

The flip-flop 601 is supplied with a reset signal RST, a clock signal CLK, and a data signal D selected by the selector 603. The reset signal RST and the clock signal CLK are input from the controller 150 of the semiconductor device shown in Embodiment 1, for example. The flip-flop 601 has a function of holding data of the data signal D that is input in response to the clock signal CLK and outputting the data as a data signal Q.

The memory circuit 602 is supplied with a write control signal WE, a read control signal RD, and a data signal selected by the selector 603. The write control signal WE and the read control signal RD are input from the controller 150 of the semiconductor device shown in Embodiment 1, for example. In the configuration of FIG. 2, by an instruction from the CPU 110, the write control signal WE and the read control signal RD are output from a signal generator circuit provided in the semiconductor device.

The memory circuit 602 has a function of storing data of an inputted data signal in accordance with the write control signal WE and outputting the stored data as a data signal in accordance with the read control signal RD.

The selector 603 is supplied with the read control signal RD through a first terminal, supplied with the data signal D through a second terminal, and supplied with a data signal D_NVM output from the memory circuit 602 through a third terminal.

The selector 603 has a function of selecting whether to output the data signal D or the data signal D_NVM through a fourth terminal, in accordance with the read control signal RD.

Next, a configuration example of the memory circuit 602 will be described with reference to FIG. 12B.

Figure 12B:
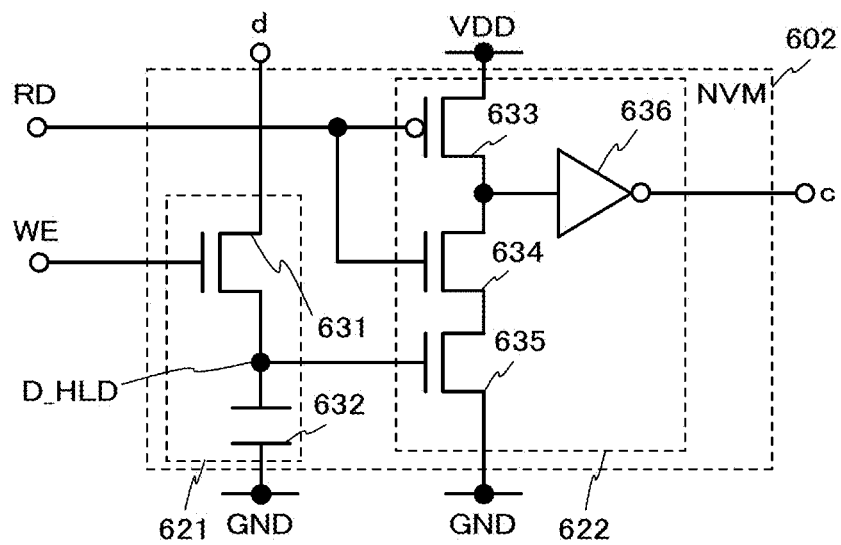

As illustrated in FIG. 12B, the memory circuit 602 includes a data retention unit 621 and a data read unit 622.

The data retention unit 621 includes a transistor 631 and a capacitor 632.

The transistor 631 is an n-channel transistor. One of a source and a drain of the transistor 631 is electrically connected to the output terminal (fourth terminal) of the selector 603. The transistor 631 has a function of controlling retention of a data signal input from the selector 603, in accordance with the write control signal WE.

As the transistor 631, the transistor with low off-state current described in Embodiment 1 can be used.

One of a pair of electrodes of the capacitor 632 is electrically connected to the other of the source and the drain of the transistor 631, and the other thereof is supplied with the ground potential (GND). The capacitor 632 has a function of holding charge based on data D_HLD of an inputted data signal. Since the off-state current of the transistor 631 is extremely low, the charge in the capacitor 632 is held and thus the data D_HLD is held even when supply of the power supply voltage stops.

The data read unit 622 includes a transistor 633, a transistor 634, a transistor 635, and an inverter 636.

The transistor 633 is a p-channel transistor. One of a source and a drain of the transistor 633 is supplied with a power supply potential (VDD). A gate of the transistor 633 is supplied with the read control signal RD. The difference between the power supply potential and the ground potential is a power supply voltage PWR.

The transistor 634 is an n-channel transistor. One of a source and a drain of the transistor 634 is electrically connected to the other of the source and the drain of the transistor 633. A gate of the transistor 634 is supplied with the read control signal RD.

The transistor 635 is an n-channel transistor. One of a source and a drain of the transistor 635 is electrically connected to the other of the source and the drain of the transistor 634, and the other thereof is supplied with the ground potential. The potential of a gate of the transistor 635 is the data D_HLD.

An input terminal of the inverter 636 is electrically connected to the other of the source and the drain of the transistor 633. An output terminal of the inverter 636 is electrically connected to the input terminal (third terminal) of the selector 603. An output signal of the inverter 636 is the data signal D_NVM.

Next, an example of a method for driving the memory circuit illustrated in FIG. 12A will be described with reference to a timing chart in FIG. 13.

First, in a period T11 which is a normal operation period, the memory circuit is supplied with the power supply voltage PWR, the reset signal RST, and the clock signal CLK. At this time, the selector 603 outputs data of the data signal D to the flip-flop 601. The flip-flop 601 holds the data of the data signal D that is input in accordance with the clock signal CLK.

Then, in a period T12 which is a backup period provided immediately before supply of the power supply voltage PWR stops, the data of the data signal D is stored in the memory circuit 602 in accordance with a pulse of the write control signal WE, and the memory circuit 602 holds the data as the data D_HLD. After that, supply of the clock signal CLK to the memory circuit stops, and then, supply of the reset signal RST to the memory circuit stops.

Next, in a period T13 which is a power stop period, supply of the power supply voltage PWR to the memory circuit stops. During this period, the value of the data D_HLD is held in the memory circuit 602 because the off-state current of the transistor 631 is low.

Then, in a period T14 which is a recovery period placed immediately before a normal operation period, supply of the power supply voltage PWR to the memory circuit starts again, and then supply of the clock signal CLK starts again, and after that supply of the reset signal RST starts again. Moreover, the data signal D_NVM having a value corresponding to the data D_HLD is output to the selector 603 from the data read unit 622 of the memory circuit 602 in accordance with a pulse of the read control signal RD. The selector 603 inputs the data signal D_NVM to the flip-flop 601 in accordance with the pulse of the read control signal RD. Thus, the flip-flop 601 can return to a state just before the power stop period.

Then, in a period T15 which is a normal operation period, normal operation of the flip-flop 601 is performed again.

The above is the example of a method for driving the memory circuit.

As has been described with reference to FIGS. 12A and 12B and FIG. 13, the memory circuit in this embodiment includes the first memory circuit (the flip-flop) and the second memory circuit including the transistor with low off-state current. Data is stored in the second memory circuit immediately before power supply stops, and then the data is input to the first memory circuit when power supply starts again; thus, the first memory circuit can return to a state just before stop of power supply. In such a manner, the recovery of the memory circuit after restart of power supply can be fast.

Embodiment 4

In this embodiment, an example of the structure of a semiconductor device which is one embodiment of the present invention will be described.

First, examples of the structure of a transistor that can be used in a semiconductor device which is one embodiment of the present invention will be described with reference to schematic cross-sectional views in FIGS. 14A and 14B. Note that components illustrated in FIGS. 14A and 14B are not to scale in some cases.

Figure 14A:
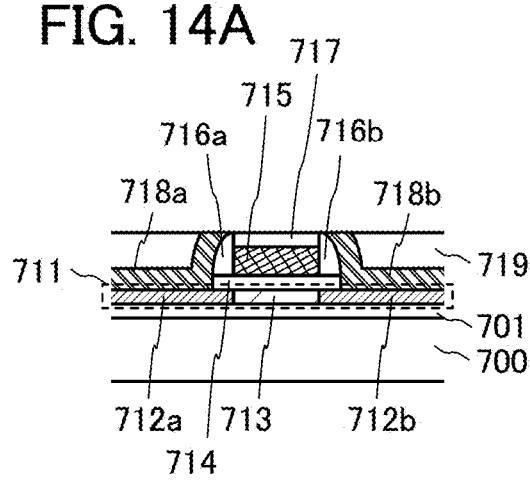
FIGS. 14A and 14B are schematic cross-sectional views each illustrating a structural example of a semiconductor device.
Figure 14B:
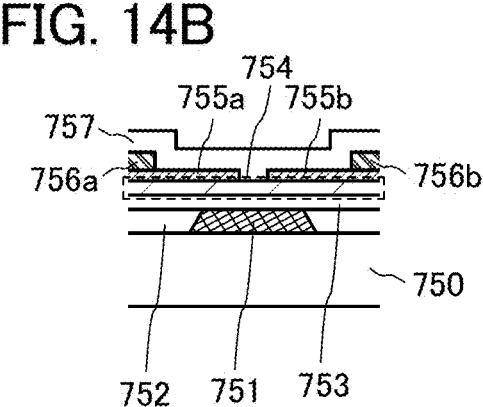

The transistor illustrated in FIG. 14A includes a semiconductor layer 711, an insulating layer 714, a conductive layer 715, insulating layers 716a and 716b, an insulating layer 717, conductive layers 718a and 718b, and an insulating layer 719.

The semiconductor layer 711 is provided over an element formation layer 700 with an insulating layer 701 placed therebetween. Note that the semiconductor layer 711 is not necessarily provided over the insulating layer 701 and may be provided directly on the element formation layer 700.

The semiconductor layer 711 includes separate regions 712a and 712b to which dopants are added, and a channel formation region 713 between the regions 712a and 712b.

The insulating layer 714 is provided over part of the semiconductor layer 711.

The conductive layer 715 is provided to overlap the semiconductor layer 711 with the insulating layer 714 placed therebetween.

The insulating layer 716a is provided in contact with one of a pair of side surfaces of the conductive layer 715, and the insulating layer 716b is provided in contact with the other of the pair of side surfaces.

The insulating layer 717 is provided over the conductive layer 715.

The conductive layer 718a is provided in contact with the region 712a, and the conductive layer 718b is provided in contact with the region 712b. The conductive layer 718a is in contact with a side surface of the insulating layer 716a, and the conductive layer 718b is in contact with a side surface of the insulating layer 716b.

The insulating layer 719 is provided over the conductive layers 718a and 718b.

The conductive layers 718a and 718b and the insulating layer 719 are formed, for example, by planarization treatment (e.g., CMP treatment) performed on a stack of a conductive film and an insulating layer.

The transistor illustrated in FIG. 14B includes a conductive layer 751, an insulating layer 752, an insulating layer 753, a semiconductor layer 754, conductive layers 755a and 755b, conductive layers 756a and 756b, and an insulating layer 757.

The conductive layer 751 is provided over an element formation layer 750.

The insulating layer 752 is provided over the element formation layer 750. Surfaces of the insulating layer 752 and the conductive layer 751 are preferably flat.

The conductive layer 751 and the insulating layer 752 are formed, for example, by planarization treatment (e.g., CMP treatment) performed on a stack of a conductive film and an insulating layer.

The insulating layer 753 is provided over the conductive layer 751 and the insulating layer 752.

The semiconductor layer 754 is provided to overlap the conductive layer 751 with the insulating layer 753 placed therebetween.

The conductive layers 755a and 755b are separated from each other and provided in contact with the semiconductor layer 754. The distance between the conductive layers 755a and 755b corresponds to the channel length of the transistor and is preferably less than 50 nm, for example. The distance between the conductive layers 755a and 755b can be made less than 50 nm, for example, by etching of part of a conductive film with a resist mask formed by electron beam exposure. In addition, the distance between the conductive layers 755a and 755b is preferably smaller than the distance between the conductive layers 756a and 756b, for example.

The conductive layer 756a is provided on and in contact with part of the conductive layer 755a, and the conductive layer 756b is provided on and in contact with part of the conductive layer 755b. The electrical resistance of the conductive layers 756a and 756b is preferably lower than that of the conductive layers 755a and 755b.

The insulating layer 757 is provided over the semiconductor layer 754 to cover an upper surface of the semiconductor layer 754.

The components will be described further below. Each of the components is not limited to a single layer and may be a stack of layers.

The insulating layer 701 is a base layer. The insulating layer 701 can be, for example, a layer containing a material such as silicon oxide, silicon nitride, silicon oxynitride, silicon nitride oxide, aluminum oxide, aluminum nitride, aluminum oxynitride, aluminum nitride oxide, or hafnium oxide.

The insulating layer 752 can be a layer containing a material similar to that of the insulating layer 701.

Each of the semiconductor layers 711 and 754 functions as a layer in which a channel of the transistor is formed (also referred to as a channel formation layer). Here, the semiconductor layer 711 in FIG. 14A and the semiconductor layer 754 in FIG. 14B will be explained.

As the semiconductor layers 711 and 754, an oxide semiconductor layer can be used, for example.

The oxide semiconductor layer is in a single crystal state, a polycrystalline (also referred to as polycrystal) state, an amorphous state, or the like. Alternatively, the oxide semiconductor layer may be a stack of an amorphous layer and a layer including crystals.

Examples of an oxide semiconductor are a metal oxide containing zinc and at least one of indium and gallium, and the metal oxide in which gallium is partly or entirely replaced with another metal element.

As the metal oxide, an In-based metal oxide, a Zn-based metal oxide, an In—Zn-based metal oxide, or an In—Ga—Zn-based metal oxide can be used, for example. Alternatively, a metal oxide including another metal element instead of part or all of Ga (gallium) in the In—Ga—Zn-based metal oxide may be used.

As the aforementioned another metal element, a metal element that is capable of combining with more oxygen atoms than gallium is can be used, for example, and specifically one or more elements of titanium, zirconium, hafnium, germanium, and tin can be used, for instance. Alternatively, as the aforementioned another metal element, one or more elements of lanthanum, cerium, praseodymium, neodymium, samarium, europium, gadolinium, terbium, dysprosium, holmium, erbium, thulium, ytterbium, and lutetium may be used. These metal elements function as a stabilizer. Note that the amount of such a metal element added is determined so that the metal oxide can function as a semiconductor. When a metal element that is capable of combining with more oxygen atoms than gallium is is used and oxygen is supplied to a metal oxide, oxygen defects in the metal oxide can be reduced.

For example, when tin is used instead of all of Ga (gallium) contained in the In—Ga—Zn-based metal oxide, an In—Sn—Zn-based metal oxide is obtained. When Ti (titanium) replaces part of Ga (gallium) contained in the In—Ga—Zn-based metal oxide, an In—Ti—Ga—Zn-based metal oxide is obtained.

The oxide semiconductor layer may be an oxide semiconductor layer containing a c-axis aligned crystalline oxide semiconductor (CAAC-OS).

The CAAC-OS is an oxide semiconductor that is not completely single crystal nor completely amorphous and has a crystal-amorphous mixed phase structure including crystal portions in an amorphous phase. In each of the crystal portions included in the CAAC-OS, the c-axis is aligned in a direction parallel to a normal vector of a surface where the CAAC-OS film is formed or a normal vector of a surface of the CAAC-OS film, triangular or hexagonal atomic arrangement is formed when seen from the direction perpendicular to the a-b plane, and metal atoms are arranged in a layered manner or metal atoms and oxygen atoms are arranged in a layered manner when seen from the direction perpendicular to the c-axis. In this specification, the term "perpendicular" includes a range from 85° to 95°, and the term "parallel" includes a range from −5° to 5°.

In a field-effect transistor including an oxide semiconductor layer containing the CAAC-OS as a channel formation layer, variations in electrical characteristics due to irradiation with visible light and ultraviolet light are small; therefore, the reliability is high.

In the case where an oxide semiconductor layer is used as the semiconductor layers 711 and 754, the oxide semiconductor layer can be highly purified in the following manner, for example: dehydration or dehydrogenation is performed so that impurities such as hydrogen, water, a hydroxyl group, and a hydride (also referred to as hydrogen compound) are removed from the oxide semiconductor layer, and oxygen is supplied to the oxide semiconductor layer. For example, a layer containing oxygen is used as the layer in contact with the oxide semiconductor layer, and heat treatment is performed; thus, the oxide semiconductor layer can be highly purified.

In addition, the oxide semiconductor layer that has just been deposited is preferably supersaturated with oxygen so that the proportion of oxygen is higher than that in the stoichiometric composition. For example, in the case of using sputtering, the oxide semiconductor layer is preferably deposited under the condition where the proportion of oxygen in a deposition gas is large, and particularly in an oxygen atmosphere (oxygen gas: 100%). Further, in order to sufficiently supply oxygen to supersaturate the oxide semiconductor layer with oxygen, an insulating layer containing excess oxygen (e.g., a $SiO_x$ layer where x>2) may be provided as the insulating layer in contact with the oxide semiconductor layer (e.g., the insulating layers 701, 714, 753, and 757).

The insulating layer containing excess oxygen is formed to contain much oxygen by setting the deposition condition for plasma CVD (PCVD) or sputtering as appropriate. In order to make the insulating layer contain much more excess oxygen, oxygen is added by ion implantation, ion doping, or plasma treatment. Moreover, oxygen may be added to the oxide semiconductor layer.

In a sputtering apparatus, an entrapment vacuum pump is preferably used because the amount of moisture remaining in a deposition chamber is preferably small. Further, a cold trap may be used.

The oxide semiconductor layer is preferably subjected to heat treatment at a substrate temperature higher than or equal to 350° C. and less than the strain point of a substrate, preferably at a substrate temperature ranging from 350° C. to 450° C. Heat treatment may be further performed in a later step. There is no particular limitation on a heat treatment apparatus to be used here, and an electric furnace or an a rapid thermal annealing (RTA) apparatus such as a gas rapid thermal annealing (GRTA) apparatus or a lamp rapid thermal annealing (LRTA) apparatus may be used. Heat treatment may be performed more than once.

After the heat treatment, a high-purity oxygen gas, a high-purity $N_2O$ gas, or ultra-dry air (having a dew point of −40° C. or lower, preferably −60° C. or lower) is preferably introduced in the furnace where the heat treatment has been performed while the heating temperature is being maintained or being decreased. In this case, it is preferable that the oxygen gas or the $N_2O$ gas do not contain water, hydrogen, and the like. The purity of the oxygen gas or the $N_2O$ gas which is introduced into the heat treatment apparatus is preferably 6N or higher, more preferably 7N or higher. That is, the impurity concentration of the oxygen gas or the $N_2O$ gas is preferably 1 ppm or lower, more preferably 0.1 ppm or lower. Through this step, oxygen is supplied to the oxide semiconductor layer, and defects due to oxygen vacancies in the oxide semiconductor layer can be reduced. Note that the high-purity oxygen gas, high-purity $N_2O$ gas, or ultra-dry air may be introduced at the time of the above heat treatment.

The hydrogen concentration of the highly purified oxide semiconductor layer, measured by SIMS, is $5\times10^{19}$ atoms/cm$^3$ or less, preferably $5\times10^{18}$ atoms/cm$^3$ or less, more preferably $5\times10^{17}$ atoms/cm$^3$ or less.

With the use of the highly purified oxide semiconductor, the carrier density of the oxide semiconductor layer in a field-effect transistor can be lower than $1\times10^{14}$/cm$^3$, preferably lower than $1\times10^{12}$/cm$^3$, further preferably lower than $1\times10^{11}$/cm$^3$. Such a low carrier density can reduce the off-state current of the field-effect transistor per micrometer of channel width to $1\times10^{-19}$ A (100 zA) or less, preferably $1\times10^{-22}$ A (100 yA) or less. It is preferable that the off-state current of the field-effect transistor be as low as possible; the lower limit of the off-state current of the field-effect transistor is estimated to be approximately $1\times10^{-30}$ A/μm.

As the dopants contained in the regions 712a and 712b, it is possible to use an element of Group 13 in the periodic table (e.g., boron), an element of Group 15 in the periodic table (e.g., one or more of nitrogen, phosphorus, and arsenic), and/or a rare gas element (e.g., one or more of helium, argon, and xenon), for example. The dopants are selected from at least one of these groups.

The insulating layers 714 and 753 each function as a gate insulating layer of the transistor. Each of the insulating layers 714 and 753 can be, for example, a layer containing a material such as silicon oxide, silicon nitride, silicon oxynitride, silicon nitride oxide, aluminum oxide, aluminum nitride, aluminum oxynitride, aluminum nitride oxide, or hafnium oxide.

The conductive layers 715 and 751 each function as a gate of the transistor. Each of the insulating layers 715 and 751 can be, for example, a layer containing a metal material such as molybdenum, titanium, chromium, tantalum, magnesium, silver, tungsten, aluminum, copper, neodymium, or scandium.

Each of the insulating layers 716a, 716b, and 717 can be, for example, a layer containing a material such as silicon oxide, silicon nitride, silicon oxynitride, silicon nitride oxide, aluminum oxide, aluminum nitride, aluminum oxynitride, aluminum nitride oxide, or hafnium oxide.

The conductive layers 718a and 718b, the conductive layers 755a and 755b, and the conductive layers 756a and 756b each function as a source or a drain of the transistor. Each of the conductive layers 718a and 718b, the conductive layers 755a and 755b, and the conductive layers 756a and 756b can be, for example, a layer containing a metal material such as molybdenum, titanium, chromium, tantalum, magnesium, silver, tungsten, aluminum, copper, neodymium, scandium, or ruthenium.

The insulating layers 719 and 757 each function as a protective layer. Each of the insulating layers 719 and 757 can be, for example, a layer containing a material such as silicon oxide, silicon nitride, silicon oxynitride, silicon nitride oxide, aluminum oxide, aluminum nitride, aluminum oxynitride, aluminum nitride oxide, or hafnium oxide.

The above is the description of the structural examples of the transistors illustrated in FIGS. 14A and 14B.

Figure 15:
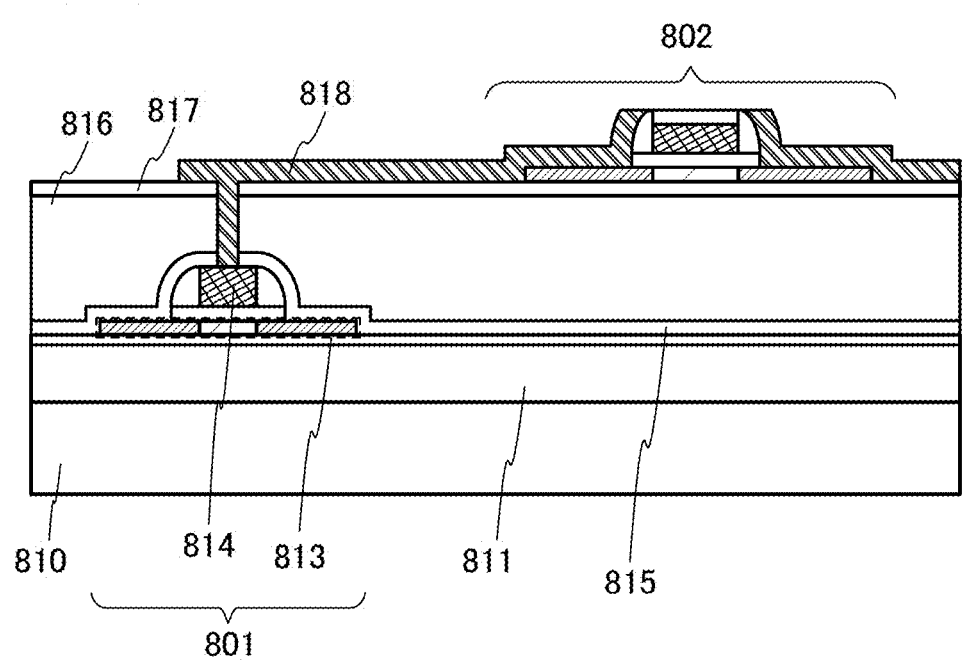
FIG. 15 is a schematic cross-sectional view illustrating a structural example of a semiconductor device.

Next, an example of the structure of a semiconductor device including the transistor illustrated in FIG. 14A will be described with reference to FIG. 15. FIG. 15 is a schematic cross-sectional view illustrating an example of the structure of a semiconductor device in this embodiment. Note that one embodiment is not limited to this structure, and the transistor illustrated in FIG. 14B may alternatively be used.

The semiconductor device illustrated in FIG. 15 includes a transistor 801 including a single crystal silicon layer 813 that is a channel formation layer, and a transistor 802 that is stacked over the transistor 801 with insulating layers 815 to 817 placed therebetween and has the structure illustrated in FIG. 14A. Note that the description of the transistor illustrated in FIG. 14A can apply to the transistor 802 as appropriate.

The single crystal silicon layer 813 is provided over a substrate 810 with an insulating layer (also referred to as BOX layer) 811 placed therebetween. Note that the transistor 801 may be configured using a semiconductor region surrounded by a buried insulating region in a single crystal semiconductor substrate, instead of using the substrate 810, the insulating layer 811, and the single crystal silicon layer 813.

The insulating layer 815 functions as a protective layer. The insulating layer 816 functions both as a protective layer and as a planarization layer. The insulating layer 817 is a base layer. Each of the insulating layers 815 to 817 can be a layer containing a material similar to that of the insulating layer 701.

A conductive layer 818 functioning as a source or a drain of the transistor 802 is connected to a conductive layer 814 functioning as a gate of the transistor 801. Note that the conductive layer 818 and the conductive layer 814 may be connected to each other through a plurality of conductive layers.

The use of the transistor with low off-state current as the transistor 802 can increase the data retention time of a memory cell.

A logic circuit (including a memory circuit) in a CPU, a signal processing circuit, or the like can be configured using the transistor 801, whereby the operation speed can be increased.

The above is the description of the structural example of the semiconductor device illustrated in FIG. 15.

As has been described with reference to FIGS. 14A and 14B and FIG. 15, in the semiconductor device of this embodiment, a transistor that controls writing and holding of data in a register or another memory device includes an oxide semiconductor layer, and a transistor of a logic circuit used in a CPU, a signal processing circuit, or the like includes a single crystal silicon layer. Thus, the data retention time of the register or another memory device can be increased while the operation speed of the semiconductor device is increased.

Embodiment 5

In this embodiment, examples of electronic devices including a semiconductor device which is one embodiment of the present invention will be described with reference to FIGS. 16A to 16F.

Figure 16A:
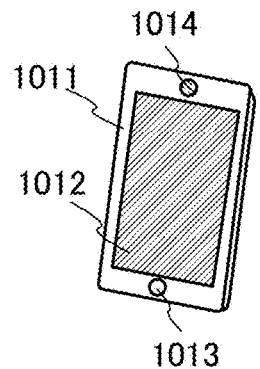
FIGS. 16A to 16F each illustrate an example of an electronic device.

The electronic device illustrated in FIG. 16A is an example of a portable information terminal.

The electronic device illustrated in FIG. 16A includes a housing 1011, a panel 1012 incorporated in the housing 1011, a button 1013, and a speaker 1014.

The housing 1011 may be provided with a connection terminal for connecting the electronic device to an external device and a button for operating the electronic device.

The panel 1012 is a display panel (display) and preferably has a function of a touch panel.

The button 1013 is provided on the housing 1011. When the button 1013 is a power button, pressing the button 1013 can turn on or off the electronic device.

The speaker 1014 is provided on the housing 1011. The speaker 1014 outputs sound.

The housing 1011 may be provided with a microphone, in which case the electronic device in FIG. 16A can function as a telephone, for example.

In the electronic device in FIG. 16A, the CPU (the CPU 111), the memory, the image processing circuit, the controller, and the like that are described in Embodiment 1 are provided in the housing 1011. Note that the CPU serving as the first CPU may be provided instead of the controller.

The electronic device in FIG. 16A functions as at least one of a telephone, an e-book reader, a personal computer, and a game machine, for example.

Figure 16B:
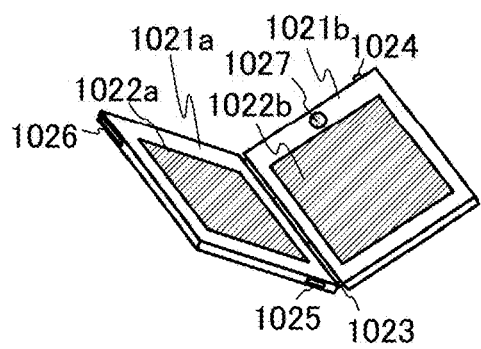

The electronic device illustrated in FIG. 16B is an example of a foldable information terminal.

The electronic device illustrated in FIG. 16B includes a housing 1021a, a housing 1021b, a panel 1022a incorporated in the housing 1021a, a panel 1022b incorporated in the housing 1021b, a hinge 1023, a button 1024, a connection terminal 1025, a storage medium insertion portion 1026, and a speaker 1027.

The housing 1021a and the housing 1021b are connected with the hinge 1023.

Each of the panels 1022a and 1022b is a display panel (display) and preferably has a function of a touch panel.

Since the electronic device in FIG. 16B includes the hinge 1023, it can be folded so that the panels 1022a and 1022b face each other.

The button 1024 is provided on the housing 1021b. Note that the button 1024 may be provided on the housing 1021a. For example, when the button 1024 having a function of a power button is provided, whether to supply power to a circuit in the electronic device can be controlled by pressing the button 1024.

The connection terminal 1025 is provided on the housing 1021a. Note that the connection terminal 1025 may be provided on the housing 1021b. Alternatively, a plurality of connection terminals 1025 may be provided on one or both of the housings 1021a and 1021b. The connection terminal 1025 is a terminal for connecting the electronic device in FIG. 16B to another device.

The storage medium insertion portion 1026 is provided on the housing 1021a. The storage medium insertion portion 1026 may be provided on the housing 1021b. Alternatively, a plurality of storage medium insertion portions 1026 may be provided on one or both of the housings 1021a and 1021b. For example, when a card storage medium is inserted into the storage medium insertion portion 1026, data can be read from the card storage medium and sent to the electronic device, or data stored in the electronic device can be written into the card storage medium.

The speaker 1027 is provided on the housing 1021b. The speaker 1027 outputs sound. The speaker 1027 may be provided on the housing 1021a.

The housing 1021a or the housing 1021b may be provided with a microphone, in which case the electronic device in FIG. 16B can function as a telephone, for example.

In the electronic device in FIG. 16B, the CPU (the CPU 111), the memory, the image processing circuit, the controller, and the like that are described in Embodiment 1 are provided in the housing 1021a or the housing 1021b. Note that the CPU serving as the first CPU may be provided instead of the controller.

The electronic device in FIG. 16B functions as any of a telephone, an e-book reader, a personal computer, and a game machine, for example.

Figure 16C:
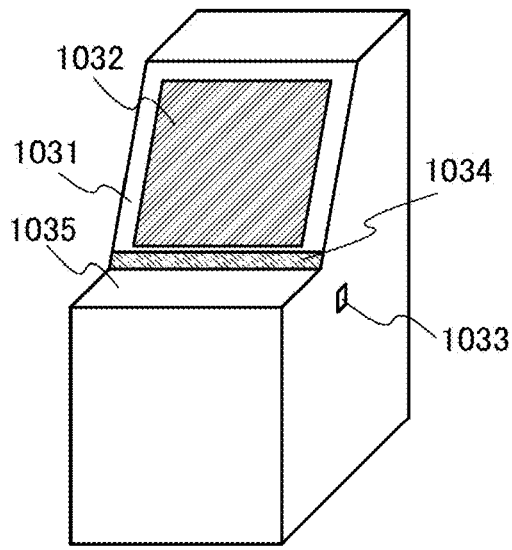

The electronic device illustrated in FIG. 16C is an example of a stationary information terminal. The stationary information terminal illustrated in FIG. 16C includes a housing 1031, a panel 1032 incorporated in the housing 1031, a button 1033, and a speaker 1034.

The panel 1032 is a display panel (display) and preferably has a function of a touch panel.

Note that a panel similar to the panel 1032 may be provided on a top board 1035 of the housing 1031, in which case the panel preferably has a function of a touch panel.

Further, the housing 1031 may be provided with a ticket slot for issuing a ticket or the like, a coin slot, a bill slot, and/or the like.

The button 1033 is provided on the housing 1031. For example, when the button 1033 is a power button, whether to supply power to a circuit in the electronic device can be controlled by pressing the button 1033.

The speaker 1034 is provided on the housing 1031. The speaker 1034 outputs sound.

In the electronic device in FIG. 16C, the CPU (the CPU 111), the memory, the image processing circuit, the controller, and the like that are described in Embodiment 1 are provided in the housing 1031. Note that the CPU serving as the first CPU may be provided instead of the controller.

The electronic device in FIG. 16C serves as an automated teller machine, an information communication terminal (also referred to as multimedia station) for ordering a ticket or the like, or a game machine, for example.

Figure 16D:
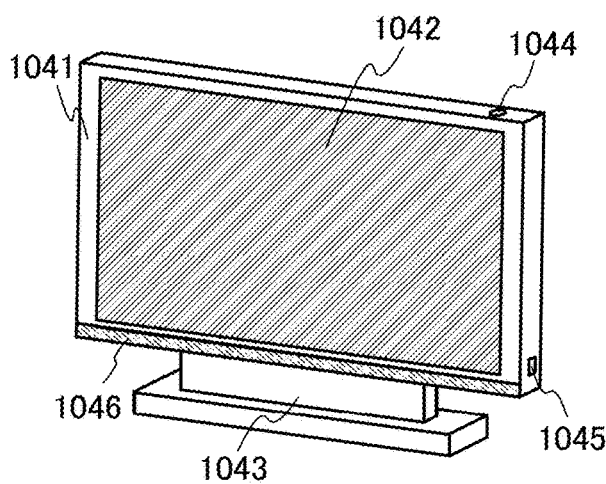

FIG. 16D illustrates an example of a stationary information terminal. The electronic device in FIG. 16D includes a housing 1041, a panel 1042 incorporated in the housing 1041, a support 1043 for supporting the housing 1041, a button 1044, a connection terminal 1045, and a speaker 1046.

Note that the housing 1041 may be provided with a connection terminal for connecting the electronic device in FIG. 16D to an external device and/or a button for operating the electronic device in FIG. 16D.

The panel 1042 functions as a display panel (display).

The button 1044 is provided on the housing 1041. For example, when the button 1044 is a power button, whether to supply power to a circuit in the electronic device can be controlled by pressing the button 1044.

The connection terminal 1045 is provided on the housing 1041. The connection terminal 1045 is a terminal for connecting the electronic device in FIG. 16D to another device. For example, when the electronic device in FIG. 16D and a personal computer are connected with the connection terminal 1045, the panel 1042 can display an image corresponding to a data signal input from the personal computer. For example, when the panel 1042 of the electronic device in FIG. 16D is larger than a panel of another electronic device connected thereto, a displayed image of the other electronic device can be enlarged, so that a plurality of viewers can easily see the image at the same time.

The speaker 1046 is provided on the housing 1041. The speaker 1046 outputs sound.

In the electronic device in FIG. 16D, the CPU (the CPU 111), the memory, the image processing circuit, the controller, and the like that are described in Embodiment 1 are provided in the housing 1041. Note that the CPU serving as the first CPU may be provided instead of the controller.

The electronic device in FIG. 16D functions as an output monitor, a personal computer, or a television set, for example.

Figure 16E:
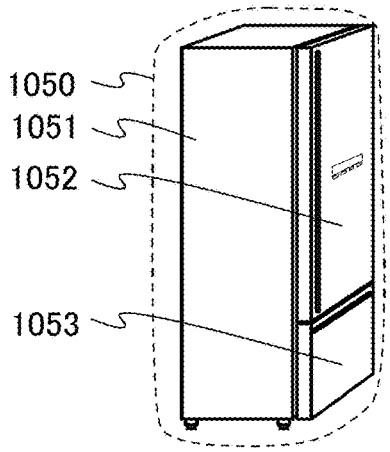

FIG. 16E illustrates an example of an electric refrigerator-freezer. An electronic device 1050 illustrated in FIG. 16E includes a housing 1051, a refrigerator door 1052, and a freezer door 1053.

In the electronic device in FIG. 16E, the CPU (the CPU 111), the memory, the image processing circuit, the controller, and the like that are described in Embodiment 1 are provided in the housing 1051. Note that the CPU serving as the first CPU may be provided instead of the controller. With this structure, power supply to the CPU, the memory, and the image processing circuit in the housing 1051 can be controlled in response to opening and closing of the refrigerator door 1052 and the freezer door 1053, for example.

Figure 16F:
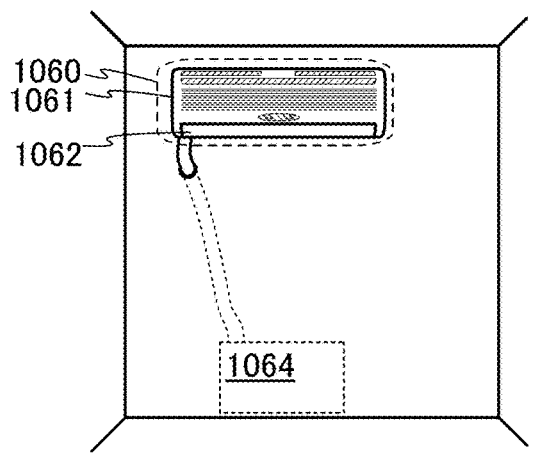

FIG. 16F illustrates an example of an air conditioner. The electronic device illustrated in FIG. 16F includes an indoor unit 1060 and an outdoor unit 1064.

The indoor unit 1060 includes a housing 1061 and a ventilation duct 1062.

In the electronic device in FIG. 16F, the CPU (the CPU 111), the memory, the image processing circuit, the controller, and the like that are described in Embodiment 1 are provided in the housing 1061. Note that the CPU serving as the first CPU may be provided instead of the controller. With this structure, power supply to the CPU, the memory, and the image processing circuit in the housing 1061 can be controlled in response to a signal from a remote controller, for example.

Note that the split-type air conditioner including the indoor unit and the outdoor unit is illustrated in FIG. 16F as an example; alternatively, an air conditioner may be such that the functions of an indoor unit and an outdoor unit are integrated in one housing.

Examples of the electronic devices are not limited to the above, and the semiconductor device in any of Embodiments 1 to 4 can also be applied to a high-frequency heating apparatus such as a microwave oven, an electric rice cooker, and the like.

The above is the description of the electronic devices illustrated in FIGS. 16A to 16F.

As has been described with reference to FIGS. 16A to 16F, the electronic device in this embodiment consumes less power by using the semiconductor device in any of Embodiments 1 to 4.

Embodiment 6

Figure 17:
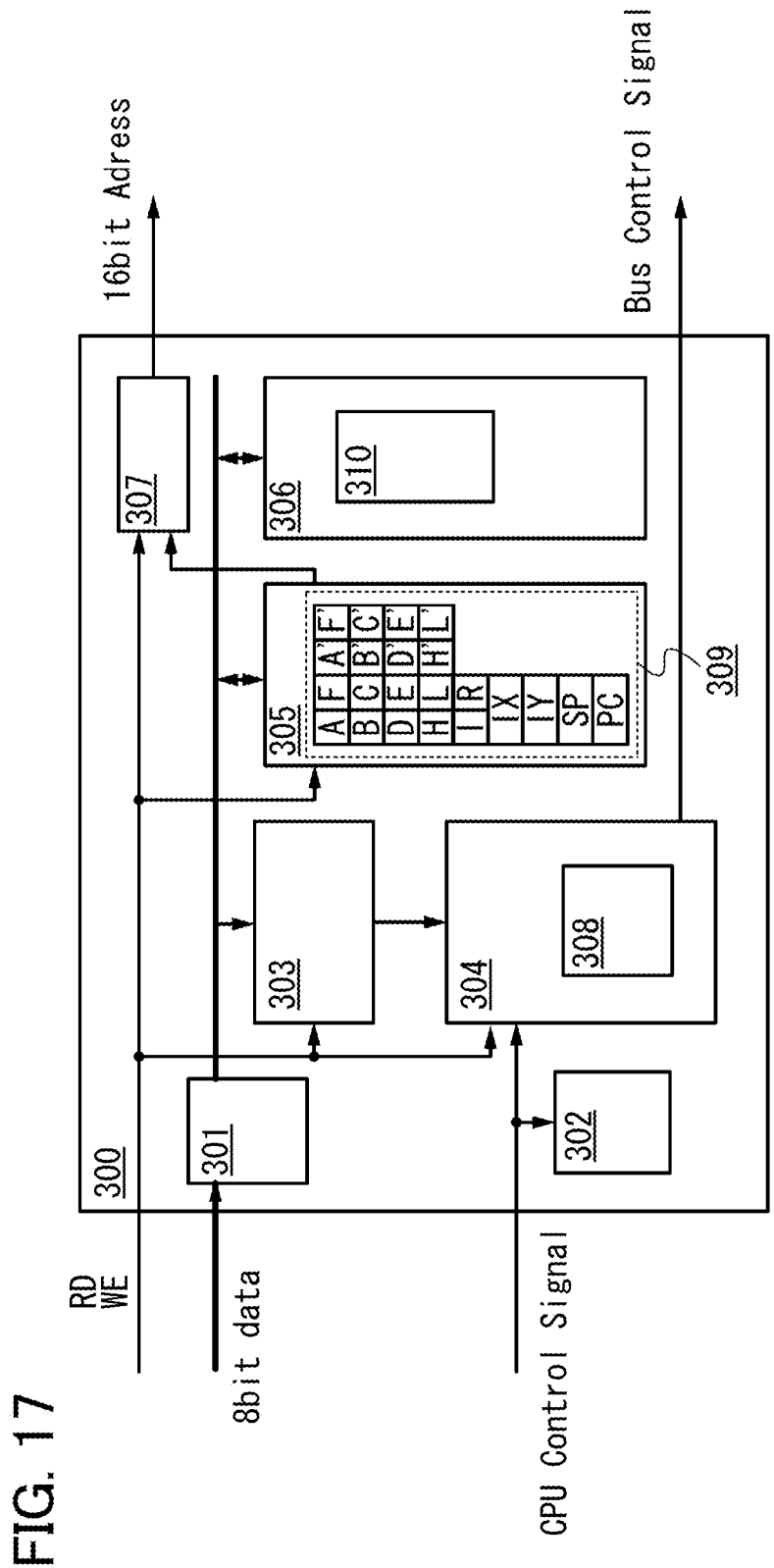
FIG. 17 illustrates an example of a CPU.

A specific embodiment of the CPU described in Embodiment 1 will be described. FIG. 17 is an example of a block diagram of the CPU.

A CPU 300 includes a circuit 301 having functions of a data latch and a selector, a circuit 302 having functions of an internal clock generator and a reset controller, a circuit 303 having functions of an instruction register and a decode unit, a CPU control unit 304, a register set 305, a calculation unit 306, and an address buffer 307.

The CPU control unit 304 includes a state generation unit 308. The register set 305 includes a plurality of registers 309. The calculation unit 306 includes an arithmetic logic unit (ALU) 310.

The write control signal WE and the read control signal RD are input to the CPU 300. Moreover, 8-bit data is input to the CPU 300 through a data bus. A CPU control signal is also input to the CPU 300.

A 16-bit address and a bus control signal are output from the CPU 300.

The write control signal WE and the read control signal RD are input to the circuit 303, the CPU control unit 304, the register set 305, and the address buffer 307. The 8-bit data is input to the circuit 303, the register set 305, and the calculation unit 306 through the data bus. The CPU control signal is input to the circuit 302 and the CPU control unit 304.

The 16-bit address is output from the address buffer 307. The bus control signal is output from the CPU control unit 304.

The circuit 303 having functions of an instruction register and a decode unit includes 8-bit registers.

The CPU control unit 304 includes 3-bit registers.

The address buffer 307 includes 16-bit registers.

The state generation unit 308 includes 24-bit registers.

The register set 305 includes 204-bit registers as the plurality of registers 309. The register 309 functions as a program counter, a general register, or an arithmetic register. In FIG. 17, A, F, A', F', B, C, B', C', D, E, D', E', H, L, H', L', I, R, IX, IY, SP, and PC shown in the registers 309 represent registers.

The CPU 300 described as one example of this embodiment includes a total of 255 registers.

Each of the circuits in the CPU 300 can input and output data, an address, and a CPU control signal through an address bus and a control bus in addition to the data bus.

Note that in the CPU 300 illustrated in FIG. 17, a register using an oxide semiconductor can be used as the total of 255 registers included in the circuit 303 having functions of an instruction register and a decode unit, the CPU control unit 304, the state generation unit 308, and the register set 305.

Figure 18:
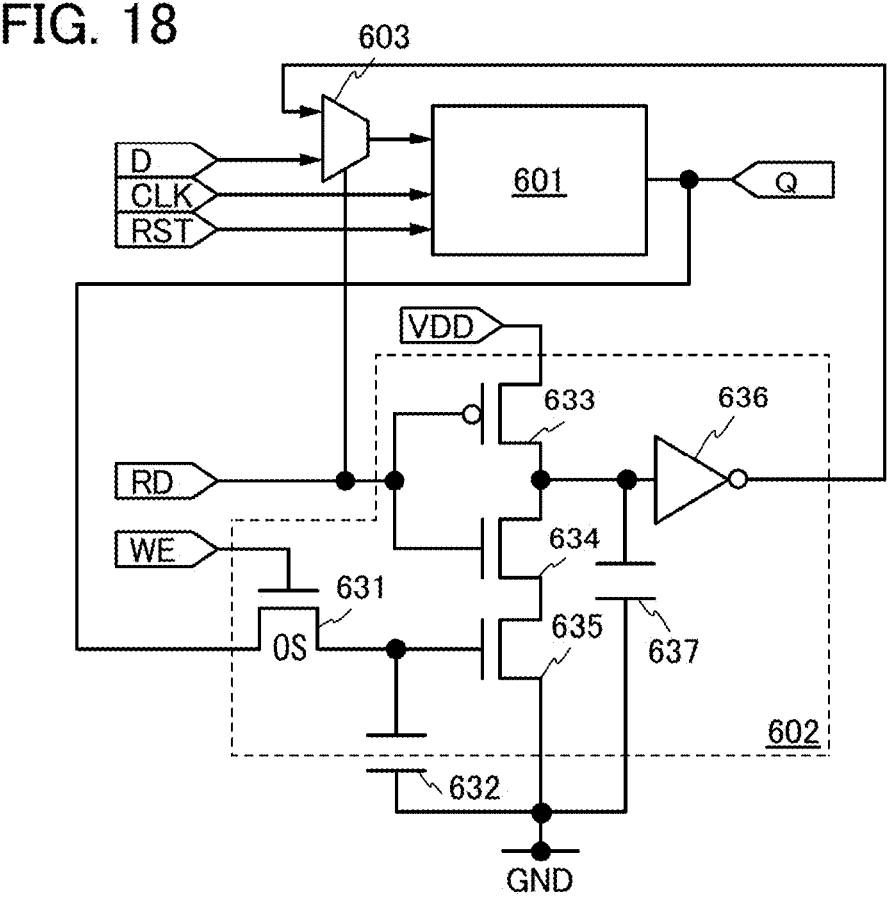
FIG. 18 illustrates an example of a register.

FIG. 18 illustrates an example of the configuration of the register that can hold 1-bit data. The configuration illustrated in FIG. 18 is a configuration in which circuits are added to the memory circuit in FIG. 12B of Embodiment 3. Accordingly, overlapping components will be described only briefly, and the description of Embodiment 3 will apply to such components.

The register illustrated in FIG. 18 includes the flip-flop 601, the memory circuit 602, and the selector 603.

The flip-flop 601 is supplied with the reset signal RST, the clock signal CLK, and the data signal D. The flip-flop 601 has a function of holding data of the data signal D that is input in response to the clock signal CLK and outputting the data as a data signal Q.

The memory circuit 602 is supplied with the write control signal WE, the read control signal RD, and a data signal.

The memory circuit 602 has a function of storing data of an inputted data signal in accordance with the write control signal WE and outputting the stored data as a data signal in accordance with the read control signal RD.

The selector 603 selects the data signal D or a data signal output from the memory circuit 602 and inputs the selected signal to the flip-flop 601 in accordance with the read control signal RD.

As illustrated in FIG. 18, the memory circuit 602 includes the transistor 631 and the capacitor 632.

The transistor 631 is an n-channel transistor. One of the source and the drain of the transistor 631 is electrically connected to an output terminal of the flip-flop 601. The transistor 631 has a function of controlling retention of a data signal output from the flip-flop 601, in accordance with the write control signal WE.

The transistor 631 can be the transistor described in Embodiment 1, which includes an oxide semiconductor and thus has low off-state current.

One of the pair of electrodes of the capacitor 632 is electrically connected to the other of the source and the drain of the transistor 631, and the other thereof is supplied with the ground potential (GND). The capacitor 632 has a function of holding charge based on data of an inputted data signal. Since the off-state current of the transistor 631 is extremely low, the charge in the capacitor 632 is held and thus the data is held even when supply of the power supply voltage stops.

The transistor 633 is a p-channel transistor. One of the source and the drain of the transistor 633 is supplied with the power supply potential (VDD). The gate of the transistor 633 is supplied with the read control signal RD. The difference between the power supply potential and the ground potential is the power supply voltage PWR.

The transistor 634 is an n-channel transistor. One of the source and the drain of the transistor 634 is electrically connected to the other of the source and the drain of the transistor 633. The gate of the transistor 634 is supplied with the read control signal RD.

The transistor 635 is an n-channel transistor. One of the source and the drain of the transistor 635 is electrically connected to the other of the source and the drain of the transistor 634, and the other thereof is supplied with the ground potential.

The input terminal of the inverter 636 is electrically connected to the other of the source and the drain of the transistor 633. The output terminal of the inverter 636 is electrically connected to the input terminal of the selector 603.

One of a pair of electrodes of a capacitor 637 is electrically connected to the input terminal of the inverter 636, and the other thereof is supplied with the ground potential. The capacitor 637 has a function of holding charge based on data of a data signal input to the inverter 636.

Figure 19:
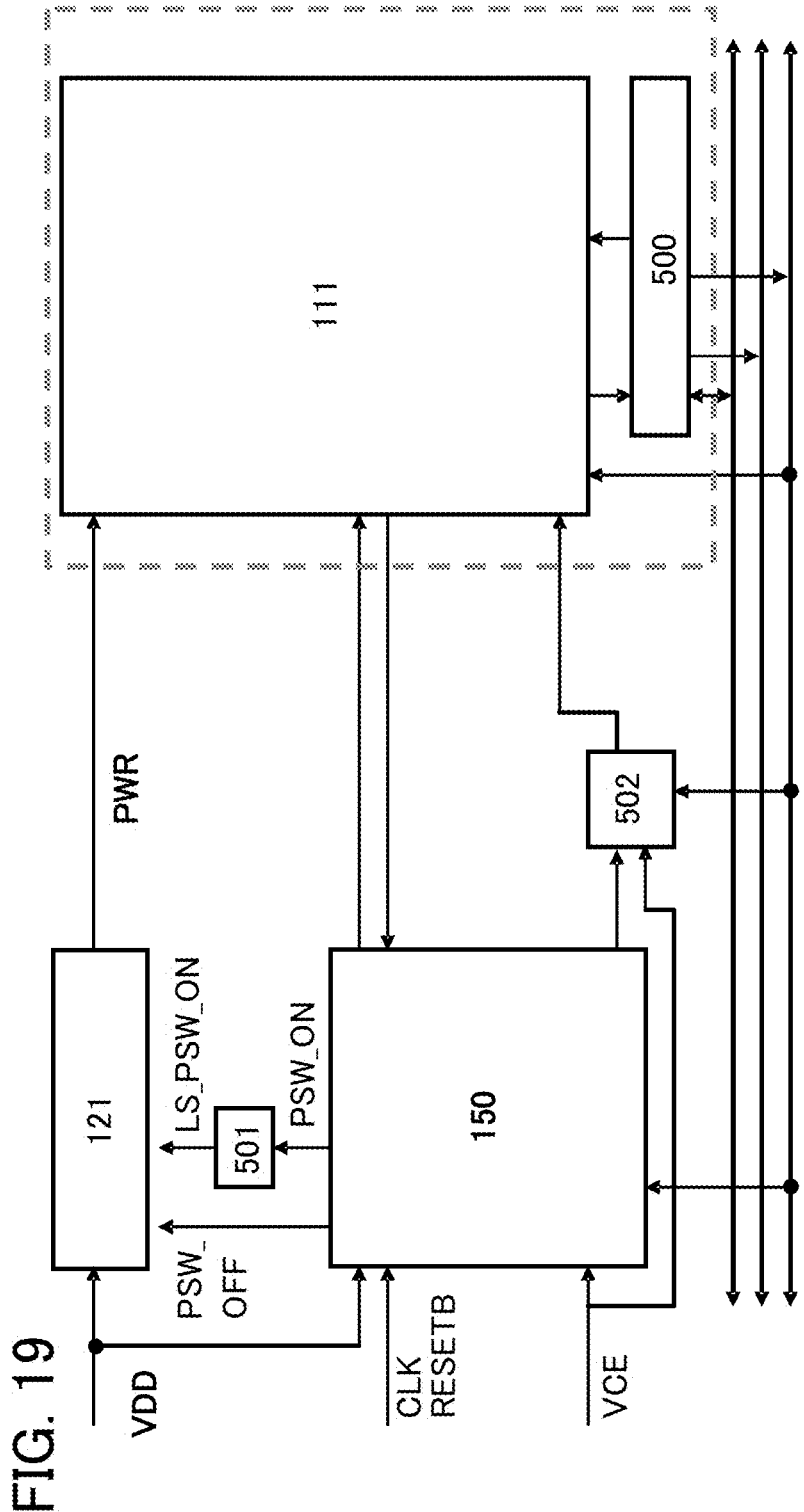
FIG. 19 illustrates an example of a semiconductor device.

FIG. 19 schematically illustrates an example of the flow of signals between the CPU 111, the power supply control switch 121, and the controller 150.

In addition to the CPU 111, the controller 150, and the power supply control switch 121, FIG. 19 also shows a level shifter 501 provided between the CPU 111 and the power supply control switch 121, a level shifter 502 provided between the controller 150 and the CPU 111, and a buffer (BUF) 500 through which various kinds of data in the CPU 111 are transferred.

The controller 150 has a function of transmitting a signal for controlling switching between a normally off state and a normal state to the CPU 111 in accordance with a control signal for the CPU 111 and a VCE signal including an instruction of switching between a normally off state and a normal state. The voltage level of the VCE signal is adjusted by the level shifter 502, and the resulting VCE signal is input to the CPU 111. Note that a "normally off" state refers to a state in which the CPU 111 stops working by stopping supply of the power supply voltage and the control signal from the controller 150. By being supplied with the power supply voltage and the control signal from the controller 150, the CPU 111 can be brought into an operating state, that is, a normal state.

Specifically, when switching of the state of the CPU 111 to a normally off state is instructed by the VCE signal, data is stored in the NVM of the register in the CPU 111. Further, the controller 150 has a function of generating the control signal SW_ON for turning on the power supply control switch 121 and the control signal SW_OFF for turning off the power supply control switch 121. The control signal SW_ON is input to the CPU 111 after its voltage level is adjusted by the level shifter 501. The power supply voltage PWR is supplied to the CPU 111 through the power supply control switch 121 while the power supply control switch 121 is on, whereas the power supply voltage PWR is not supplied to the CPU 111 while the power supply control switch 121 is off.

The controller 150 also has a function of generating a clock signal C-CLK used in the CPU 111 from the clock signal CLK and a reset signal RESETB that are input to the semiconductor device 100.

This embodiment can be implemented in combination with any of the other embodiments as appropriate.

Embodiment 7

Figure 20:
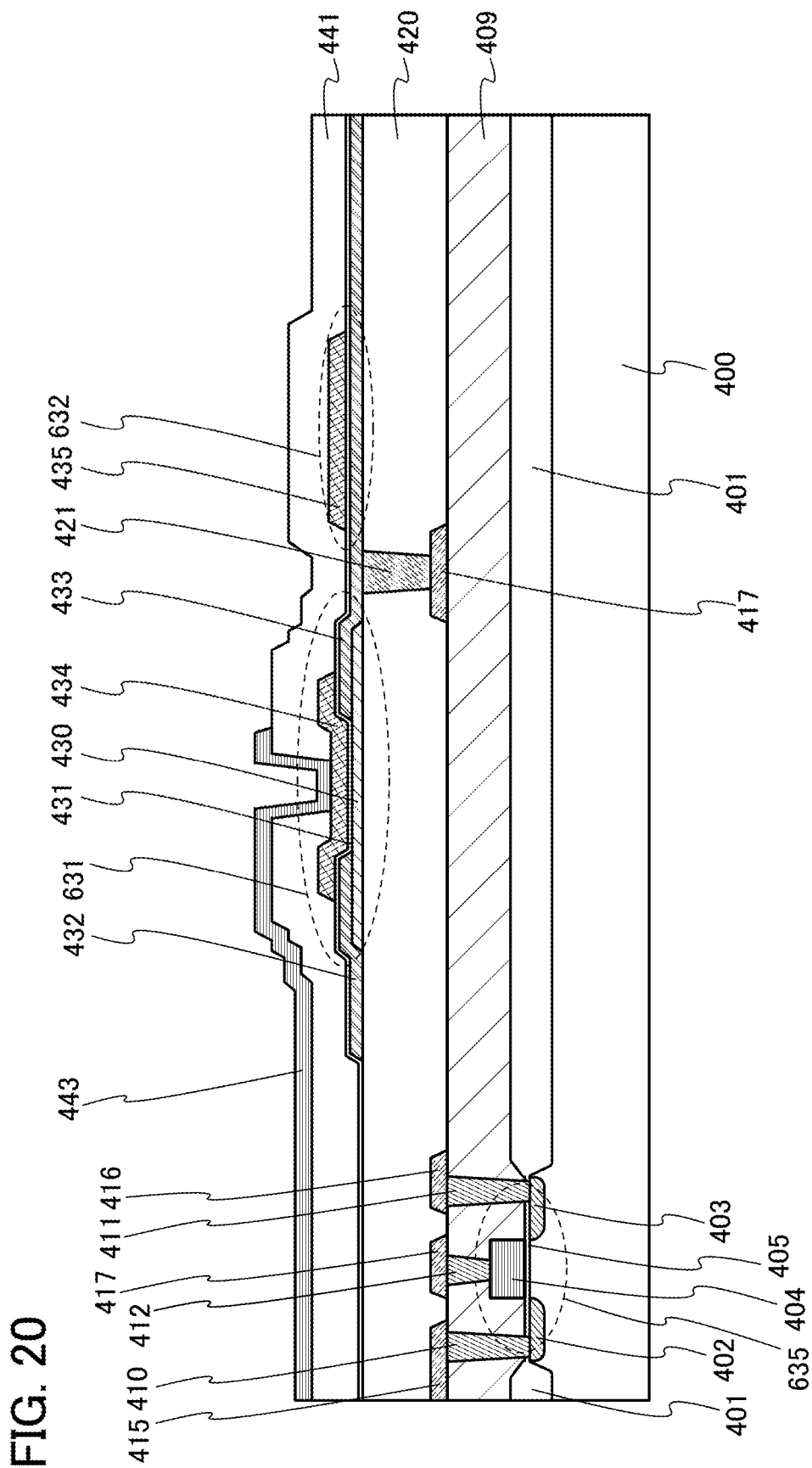
FIG. 20 illustrates an example of a semiconductor device.

FIG. 20 illustrates an example of part of a cross-sectional structure of a semiconductor device according to one embodiment of the present invention. FIG. 20 shows the transistor 631, the capacitor 632, and the transistor 635 as an example.

This embodiment shows the case where the transistor 635 is formed over a single crystal silicon substrate, and the transistor 631 including an active layer containing an oxide semiconductor and the capacitor 632 are formed over the transistor 635. In the transistor 635, an active layer may be a semiconductor thin film of silicon, germanium, or the like in an amorphous, microcrystalline, polycrystalline, or signal crystal state. Alternatively, the active layer in the transistor 635 may be formed using an oxide semiconductor. In the case where an oxide semiconductor is used for active layers of all the transistors, the transistor 631 is not necessarily stacked over the transistor 635, and the transistors 631 and 635 may be formed in the same layer.

In the case where the transistor 635 is formed using a silicon thin film, any of the following can be used, for example: amorphous silicon formed by sputtering or vapor phase growth such as plasma CVD, polycrystalline silicon obtained by crystallization of amorphous silicon by laser annealing or the like, and single crystal silicon obtained in such a manner that a surface portion of a single crystal silicon wafer is separated after implantation of hydrogen ions or the like into the silicon wafer.

In the case where, among transistors included in the register which is the memory circuit described in Embodiment 6, the transistor 631 is formed using an oxide semiconductor and the other transistors including the transistor 635 are formed using silicon, the number of transistors using an oxide semiconductor is smaller than that of transistors using silicon. Thus, stacking the transistor 631 over the transistor using silicon allows the design rule of the transistor 631 to be relaxed.

The chip area of the CPU can be reduced with the use of such a register in which a transistor using silicon and a transistor using an oxide semiconductor are stacked. Since the number of transistors using silicon is larger than that of transistors using an oxide semiconductor in one circuit block, the actual chip area of the CPU depends on the number of transistors using silicon. In the register having the configuration shown in Embodiment 6, the ratio of the number of transistors using silicon to the number of transistors using an oxide semiconductor is 20:1 to 40:1.

In FIG. 20, the n-channel transistor 635 is formed over a semiconductor substrate 400.

Examples of the semiconductor substrate 400 are an n-type or p-type silicon substrate, germanium substrate, silicon germanium substrate, and compound semiconductor substrate (e.g., GaAs substrate, InP substrate, GaN substrate, SiC substrate, GaP substrate, GaInAsP substrate, and ZnSe substrate). As an example, FIG. 20 illustrates the case where an n-type single crystal silicon substrate is used.

The transistor 635 is electrically isolated from other transistors by an element isolation insulating film 401. The element isolation insulating film 401 can be formed by a local oxidation of silicon (LOCOS) method, a trench isolation method, or the like.

Specifically, the transistor 635 includes impurity regions 402 and 403 that are formed in the semiconductor substrate 400 and function as a source region and a drain region, a gate electrode 404, and a gate insulating film 405 provided between the semiconductor substrate 400 and the gate electrode 404. The gate electrode 404 overlaps a channel formation region formed between the impurity regions 402 and 403, with the gate insulating film 405 placed between the gate electrode 404 and the channel formation region.

An insulating film 409 is provided over the transistor 635. Openings are formed in the insulating film 409. A wiring 410 in contact with the impurity region 402, a wiring 411 in contact with the impurity region 403, and a wiring 412 in contact with the gate electrode 404 are formed in the openings.

The wiring 410 is connected to a wiring 415 formed over the insulating film 409. The wiring 411 is connected to a wiring 416 formed over the insulating film 409. The wiring 412 is connected to a wiring 417 formed over the insulating film 409.

An insulating film 420 is formed over the wirings 415 to 417. An opening is formed in the insulating film 420. A wiring 421 connected to the wiring 417 is formed in the opening.

In FIG. 20, the transistor 631 and the capacitor 632 are formed over the insulating film 420.

The transistor 631 includes, over the insulating film 420, a semiconductor film 430 containing an oxide semiconductor, conductive films 432 and 433 that are positioned over the semiconductor film 430 and function as a source electrode and a drain electrode, a gate insulating film 431 over the semiconductor film 430 and the conductive films 432 and 433, and a gate electrode 434 that is positioned over the gate insulating film 431 and overlaps the semiconductor film 430 between the conductive films 432 and 433. Note that the conductive film 433 is connected to the wiring 421.

A conductive film 435 is provided over the gate insulating film 431 to overlap the conductive film 433. A portion where the conductive film 435 overlaps the conductive film 433 with the gate insulating film 431 placed therebetween functions as the capacitor 632.

Note that the case where the capacitor 632, together with the transistor 631, is provided over the insulating film 420 is illustrated in FIG. 20 as an example; alternatively, the capacitor 632 may be provided below the insulating film 420 along with the transistor 635.

An insulating film 441 is provided over the transistor 631 and the capacitor 632. An opening is formed in the insulating film 441. A conductive film 443 that is in contact with the gate electrode 434 in the opening is provided over the insulating film 441.

In FIG. 20, the transistor 631 includes the gate electrode 434 on at least one side of the semiconductor film 430.

Alternatively, the transistor 631 may include a pair of gate electrodes with the semiconductor film 430 placed therebetween.

In the case where the transistor 631 has a pair of gate electrodes with the semiconductor film 430 therebetween, one of the gate electrodes is supplied with a signal for turning on or off the transistor 631, and the other of the gate electrodes may be in a floating state (i.e., electrically insulated) or supplied with a potential. In the latter case, potentials with the same level may be supplied to the pair of electrodes, or a fixed potential such as the ground potential may be supplied only to the other of the gate electrodes. By controlling the level of a potential supplied to the other of the gate electrodes, the threshold voltage of the transistor 631 can be controlled.

This embodiment can be implemented in combination with any of the other embodiments as appropriate.

Embodiment 8

This embodiment will describe an architecture in which a power gate that allows supply of the power supply voltage to be controlled independently for each circuit is controllable by a program.

Figure 21:
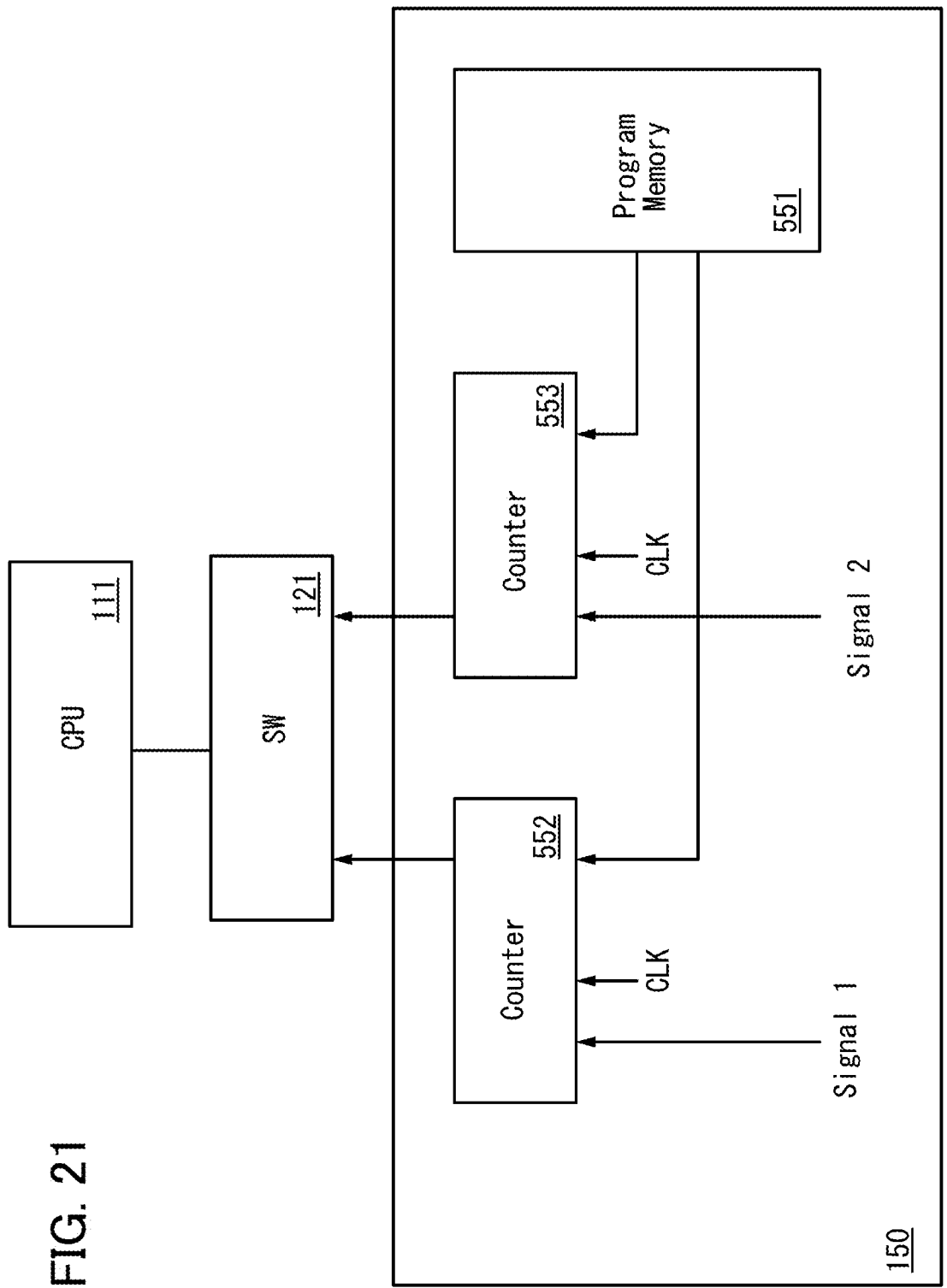
FIG. 21 illustrates an example of a semiconductor device.
Figure 22A:
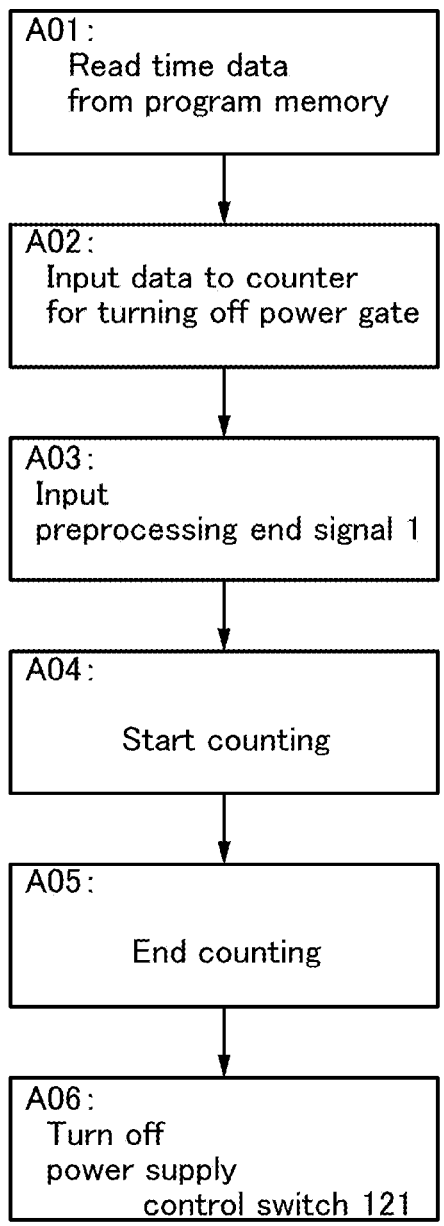
FIGS. 22A and 22B are charts for explaining an example of a semiconductor device.
Figure 22B:
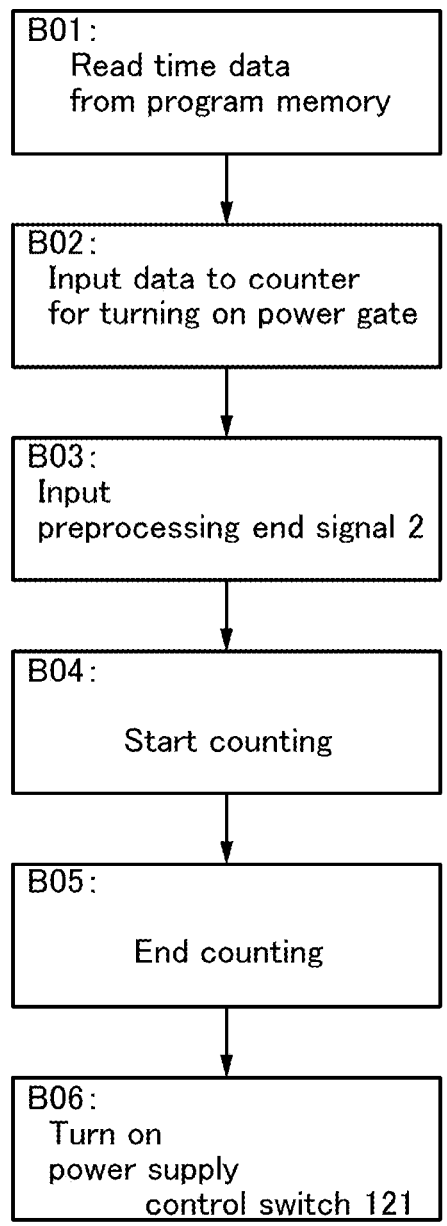

FIG. 21 and FIGS. 22A and 22B are diagrams for explaining an example of the architecture in which a power gate is controllable by a program. FIG. 21 illustrates the case where supply of the power supply voltage to the CPU 111, the memory 112, and the signal processing circuit 113, which are described with reference to FIG. 1, is controlled by the power supply control switches 121, 122, and 123 that are power gates. In this embodiment, the power supply control switch 121, through which the power supply voltage is supplied to the CPU 111, is described as an example.

The program is stored in a program memory 551 that is added to the controller 150 described in Embodiment 1. In this embodiment, the controller 150 includes a counter 552 for turning off the power gate and a counter 553 for turning on the power gate in addition to the program memory 551.

The counter 552 for turning off the power gate is supplied with the clock signal CLK and a preprocessing end signal 1. The counter 553 for turning on the power gate is supplied with the clock signal CLK and a preprocessing end signal 2.

The program memory 551 may be a volatile memory to which a program is externally input, or may be a nonvolatile memory.

By the program stored in the program memory 551, the order of and preparation time for rising and falling of the power supply control switches 121 to 123 and the circuits connected thereto, such as the CPU 111, the memory 112, and the signal processing circuit 113, can be set, for example. The order and preparation time can be changed by rewriting of the program, so that the flexibility of the settings can be ensured without changing the internal circuit.

The architecture and flowcharts for the case where the preparation time is changed by a program will be described below.

First, the architecture in this case is such that the controller 150 includes the program memory 551, the counter 552 for turning off the power gate, and the counter 553 for turning on the power gate as illustrated in FIG. 21.

Next, a flowchart for explaining the case of turning off the power gate is shown in FIG. 22A. Data on the preparation time is read from the program memory 551 (A01: READ TIME DATA FROM PROGRAM MEMORY). Then, the data is input to the counter 552 for turning off the power gate and the counter 553 for turning on the power gate (A02: INPUT DATA TO COUNTER FOR TURNING OFF POWER GATE). Next, when the preprocessing end signal 1 is input (A03: INPUT PREPROCESSING END SIGNAL 1), the counter 552 for turning off the power gate starts counting (A04: START COUNTING). When the counting reaches a count number input from the program memory 551, the counter 552 for turning off the power gate stops counting (A05: END COUNTING) and outputs a signal to turn off the power supply control switch 121 (A06: TURN OFF POWER SUPPLY CONTROL SWITCH 121). The preparation time can be changed as appropriate by changing the contents of the program memory 551.

A flowchart for explaining the case of turning on the power supply control switch 121 is shown in FIG. 22B. Data on the preparation time is read from the program memory 551 (B01: READ TIME DATA FROM PROGRAM MEMORY). Then, the data is input to the counter 552 for turning off the power gate and the counter 553 for turning on the power gate (B02: INPUT DATA TO COUNTER FOR TURNING ON POWER GATE). Next, when the preprocessing end signal 2 is input (B03: INPUT PREPROCESSING END SIGNAL 2), the counter 553 for turning on the power gate starts counting (B04: START COUNTING). When the counting reaches a count number input from the program memory 551, the counter 553 for turning on the power gate stops counting (B05: END COUNTING) and outputs a signal to turn on the power supply control switch 121 (B06: TURN ON POWER SUPPLY CONTROL SWITCH 121). The preparation time can be changed as appropriate by changing the contents of the program memory 551.

According to the flowcharts, the settings can be changed as appropriate only by changing the program.

EXPLANATION OF REFERENCE

21: transistor, 22: transistor, 100: semiconductor device, 100A: microcomputer, 101: input device, 102: output device, 110: CPU, 111: CPU, 112: memory, 113: signal processing circuit, 113A: image processing circuit, 114: memory, 121: power supply control switch, 122: power supply control switch, 123: power supply control switch, 124: power supply control switch, 150: controller, 151: interface unit, 152: clock generation unit, 153: output signal control unit, 154: buffer unit, 155: counter circuit, 171: touch panel, 172: touch panel controller, 173: keyboard, 174: keyboard controller, 181: display, 182: display controller, 190: power source, 200: memory cell, 211: transistor, 212: transistor, 213: capacitor, 300: CPU, 301: circuit, 302: circuit, 303: circuit, 304: CPU control unit, 305: register set, 306: calculation unit, 307: address buffer, 308: state generation unit, 309: register, 310: ALU, 400: semiconductor substrate, 401: element isolation insulating film, 402: impurity region, 403: impurity region, 404: gate electrode, 405: gate insulating film, 409: insulating film, 410: wiring, 411: wiring, 412: wiring, 415: wiring, 416: wiring, 417: wiring, 420: insulating film, 421: wiring, 430: semiconductor film, 431: gate insulating film, 432: conductive film, 433: conductive film, 434: gate electrode, 435: conductive film, 441: insulating film, 443: conductive film, 500: buffer, 501: level shifter, 502: level shifter, 551: program memory, 552: counter for turning off power gate, 553: counter for turning on power gate, 601: flip-flop, 602: memory circuit, 603: selector, 621: data retention unit, 622: data read unit, 631: transistor, 632: capacitor, 633: transistor, 634: transistor, 635: transistor, 636: inverter, 637: capacitor, 700: element formation layer, 701: insulating layer, 711: semiconductor layer, 712*a*: region, 712*b*: region, 713: channel formation region, 714: insulating layer, 715: conductive layer, 716*a*: insulating layer, 716*b*: insulating layer, 717: insulating layer, 718*a*: conductive layer, 718*b*: conductive layer, 719: insulating layer, 750: element formation layer, 751: conductive layer, 752: insulating layer, 753: insulating layer, 754: semiconductor layer, 755*a*: conductive layer, 755*b*: conductive layer, 756*a*: conductive layer, 756*b*: conductive layer, 757: insulating layer, 801: transistor, 802: transistor, 810: substrate, 811: insulating layer, 813: single crystal silicon layer, 814: conductive layer, 815: insulating layer, 816: insulating layer, 817: insulating layer, 818: conductive layer, 1011: housing, 1012: panel, 1013: button, 1014: speaker, 1021*a*: housing, 1021*b*: housing, 1022*a*: panel, 1022*b*: panel, 1023: hinge, 1024: button, 1025: connection terminal, 1026: storage medium insertion portion, 1027: speaker, 1031: housing, 1032: panel, 1033: button, 1034: speaker, 1035: top board, 1041: housing, 1042: panel, 1043: support, 1044: button, 1045: connection terminal, 1046: speaker, 1050: electronic device, 1051: housing, 1052: refrigerator door, 1053: freezer door, 1060: indoor unit, 1061: housing, 1062: ventilation duct, 1064: outdoor unit, 1100: program memory, 1110: register, 1130: register This application is based on Japanese Patent Applications Serial No. 2012-011120, No. 2012-011124, and No. 2012-105538 filed with Japan Patent Office on Jan. 23, 2012, Jan. 23, 2012, and May 3, 2012, respectively, the entire contents of which are hereby incorporated by reference.

The invention claimed is:

1. A semiconductor device comprising:
a CPU comprising a memory circuit; and
a switch between the CPU and a power source,
wherein the switch is electrically connected to a controller, wherein the memory circuit comprises a first transistor which comprises an oxide semiconductor layer in a channel formation layer,
wherein the CPU comprises a second transistor which comprises a single crystal silicon layer in a channel formation layer,
wherein one of a source and a drain of the first transistor is electrically connected to a gate of the second transistor,
wherein the first transistor is stacked over the second transistor with an insulating layer therebetween, and
wherein a first conductive layer functioning as the one of the source and the drain of the first transistor is in contact with a top surface of a second conductive layer functioning as the gate of the second transistor through an opening of the insulating layer.

2. The semiconductor device according to claim 1,
wherein the switch is configured to control supply or stop of a power supply voltage to the CPU.

3. The semiconductor device according to claim 1,
wherein the CPU comprises a logic circuit, and
wherein the second transistor is included in the logic circuit.

4. A semiconductor device comprising:
a CPU comprising a memory circuit; and
a switch between the CPU and a power source,
wherein the switch is electrically connected to a controller,
wherein the memory circuit comprises a first transistor which comprises an oxide semiconductor layer in a channel formation layer,
wherein the CPU comprises a second transistor which comprises a single crystal silicon layer in a channel formation layer,
wherein one of a source and a drain of the first transistor is electrically connected to a gate of the second transistor,
wherein the first transistor is stacked over the second transistor with an insulating layer therebetween,
wherein a first conductive layer functioning as the one of the source and the drain of the first transistor is in contact with a top surface of a second conductive layer functioning as the gate of the second transistor through an opening of the insulating layer, and
wherein the oxide semiconductor layer comprises indium.

5. The semiconductor device according to claim 4,
wherein the switch is configured to control supply or stop of a power supply voltage to the CPU.

6. The semiconductor device according to claim 4,
wherein the CPU comprises a logic circuit, and
wherein the second transistor is included in the logic circuit.

* * * * *